(12) United States Patent
Meguro

(10) Patent No.: US 6,175,471 B1
(45) Date of Patent: *Jan. 16, 2001

(54) DISC CARTRIDGE HAVING CONFIGURATION TO PREVENT INSERTION INTO CERTAIN DISK DRIVES

(75) Inventor: Hiroshi Meguro, Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/982,159

(22) Filed: Dec. 1, 1997

(30) Foreign Application Priority Data

Dec. 3, 1996 (JP) .................................. 8-323159

(51) Int. Cl.$^7$ .................................................. G11B 23/03
(52) U.S. Cl. ............................................................. 360/133
(58) Field of Search .................................. 369/289, 291; 360/133

(56) References Cited

U.S. PATENT DOCUMENTS

| | | | |
|---|---|---|---|
| 5,530,691 | * 6/1996 | Fujisawa | 369/291 |
| 5,548,571 | * 8/1996 | Mistretta | 369/77.2 |
| 5,570,252 | * 10/1996 | Sumner et al. | 360/133 |
| 5,631,791 | * 5/1997 | Osaki et al. | 360/133 |
| 5,748,420 | * 5/1998 | Ko et al. | 360/133 |
| 5,953,187 | 9/1999 | Uwabo et al. | 360/133 |

* cited by examiner

Primary Examiner—Brian E. Miller
(74) Attorney, Agent, or Firm—Frommer Lawrence & Haug, LLP; William S. Frommer; Mathew K. Ryan

(57) ABSTRACT

A disc cartridge designed to prevent mistaken loading on a recording and/or reproducing apparatus in which only a disc cartridge having different specifications can be loaded. The disc cartridge includes a main cartridge body portion 13 for housing a magnetic disc 11 having different specifications from those of a magnetic disc housed in a conventional disc cartridge 101, and recording/reproducing apertures 26, 27 formed in the main cartridge body portion 13 so as to be faced by a recording/reproducing unit provided on the recording/reproducing apparatus. The disc cartridge also includes a shutter member 28 for opening/closing the recording/reproducing apertures 26, 27 and loading regulating portions 51, 52 provided on the main cartridge body portion 13 for regulating loading of the main cartridge body portion on the recording/reproducing apparatus 110 in which only the conventional disc cartridge 101 can be loaded.

6 Claims, 22 Drawing Sheets

DISC CARTRIDGE HAVING CONFIGURATION TO PREVENT INSERTION INTO CERTAIN DISK DRIVES

BACKGROUND OF THE INVENTION

1. Field of the Invention

This invention relates to a disc cartridge for rotatably housing a disc-shaped recording medium, such as a magnetic disc.

2. Description of Related Art

Up to now, a disc cartridge having a magnetic disc as an information recording medium housed therein has generally been used for an electronic equipment, such as a computer. This disc cartridge is now explained by referring to the drawings.

This disc cartridge is comprised of a magnetic disc rotatably housed within a main cartridge body portion 103 made up of an upper cartridge half and a lower cartridge half combined together, as shown in FIGS. 1 to 5. In this main cartridge body portion 103 is formed a recording/reproducing aperture, not shown, faced by a recording/reproducing head provided on a recording/reproducing apparatus 110, as later explained, in adjacency to the front end faced by the recording/reproducing apparatus 110, and a shutter member 107 is arranged for opening/closing the recording/reproducing aperture, as shown in FIGS. 1 and 2.

The main cartridge body portion 103 of the disc cartridge 101 has a pre-set longitudinal size L in a direction parallel to the direction of insertion into the recording/reproducing apparatus 110 and a pre-set width W and a pre-set thickness (height) H in a direction perpendicular to the direction of insertion, as shown in FIGS. 3 to 5.

The recording/reproducing apparatus 110, into which is inserted the above-described disc cartridge 101, is now explained by referring to FIGS. 6 to 9. This recording/reproducing apparatus 110 includes a substantially rectangular cartridge inserting aperture 110a, into which is inserted the disc cartridge 101, as shown in FIG. 6. This cartridge inserting aperture 110a has a pre-set width $W_D$ and a pre-set height $H_D$, as shown in FIG. 6. In an opening portion is mounted a lid 110b for opening/closing the opening portion.

Referring to FIG. 7, the recording/reproducing apparatus 110 has, in the cartridge loading portion for loading the disc cartridge 101 therein, a base plate 110c on which is set the disc cartridge 101 inserted from the cartridge inserting aperture 110a, and a holder member 110d in which is housed the inserted disc cartridge 101.

Referring to FIG. 7, when the disc cartridge 101 is inserted from the cartridge inserting aperture 110a, the front surface of the main cartridge body portion compresses against the lid 110b of the recording/reproducing apparatus 110 for pivoting and uplifting the lid 110b in the direction indicated by arrow D in FIG. 7.

Referring to FIG. 8, the disc cartridge 101 inserted from the cartridge inserting aperture 110a of the recording/reproducing apparatus 110 is advanced along a base plate 110c so as to be housed within a holder member 110d. The front surface of the disc cartridge 101 compresses against an abutment surface of the holder member 110d for sliding the holder member 110d in a direction shown by arrow C in FIG. 8.

Referring to FIG. 9, the size of the recording/reproducing apparatus 110 in a direction parallel to the direction of insertion of a cartridge loading section, corresponding to the size between the abutment surface of the holder member 110d and a guide provided at the cartridge inserting aperture 110a, is set to a longitudinal size $L_D$ slightly larger than the longitudinal size L of the disc cartridge 101.

Referring to FIG. 9, when loaded at the pre-set cartridge loading position, the disc cartridge 101 is thrust onto the base plate 110c under the force of a spring 110e provided on the holder member 110d, whilst the holder member 110d and the base plate 110c are moved in the direction indicated by arrow E in FIG. 9 so as to be set on a turntable, not shown. When the disc cartridge 101 is loaded in position, there is maintained a pre-set clearance between its front surface and the abutment surface of the holder member 110d, while there is also maintained a pre-set clearance between its rear surface and the guide of the cartridge inserting aperture 110a.

The disc cartridge 101 has its magnetic disc rotated by the turntable for recording/reproducing information signals on or from the magnetic disc.

With the recent tendency towards multi-media, the information signals being handled, such as picture data or speech data, have become diversified and voluminous. In keeping up with this tendency, the recording capacity of the disc cartridge is also increasing. Thus, it is required of the disc cartridge to be able to record information signals to high density. Specifically, there is currently proposed a large-capacity disc cartridge of an outer size substantially equal to that of a conventional disc cartridge and having the recording capacity for information signals of the order of 120 megabytes (MB).

Since the main cartridge body portion of the large-capacity disc cartridge has the outer size approximately equal to that of the conventional disc cartridge 101, there is a risk of inadvertent insertion of the large-capacity disc cartridge on the recording/reproducing apparatus 101 designed for loading only the conventional low-capacity disc cartridge 101 thereon.

Since the information signals are recorded to high recording density on the large-capacity disc cartridge such that the recording tracks for information signals of the large-capacity disc cartridge are of narrow widths, if such large-capacity disc cartridge is inadvertently loaded on the conventional recording/reproducing apparatus 110 having different specifications, such as recording capacity, there is raised a problem that signal errors be produced, or information signals recorded on the magnetic disc be destroyed.

SUMMARY OF THE INVENTION

It is therefore an object of the present invention to provide a disc cartridge which can be positively prevented from being inadvertently loaded on a recording/reproducing apparatus into which can be loaded only a disc cartridge housing a disc-shaped recording medium of different specifications.

The present invention provides a disc cartridge including a main cartridge body portion having housed therein a disc-shaped recording medium having specifications different from those of a disc-shaped recording medium housed within a first disc cartridge, a recording/reproducing aperture provided in main cartridge body portion for being faced by recording and/or reproducing means provided on a recording and/or reproducing apparatus, and a shutter member provided for opening/closing recording/reproducing aperture. The disc cartridge also includes a loading regulating portion provided on a main cartridge body portion for regulating loading of a recording and/or reproducing apparatus adapted for loading only the first disc cartridge thereon.

In this disc cartridge, the loading regulating portion provided on the main cartridge body portion operates for preventing the disc cartridge from being inadvertently loaded on a recording and/or reproducing apparatus in which only the first disc cartridge is loaded.

With the present disc cartridge, the loading regulating portion is provided for regulating loading the disc cartridge on a recording and/or reproducing apparatus in which only the first disc cartridge is loaded. Thus, the disc cartridge can be positively prevented from being inadvertently loaded on a recording and/or reproducing apparatus having different specifications. Therefore, with the present disc cartridge, there is no risk of the disc cartridge being loaded on the recording and/or reproducing apparatus having different specifications to destruct the information signals recorded on the disc-shaped recording medium.

DESCRIPTION OF PREFERRED EMBODIMENTS

Figure 1:
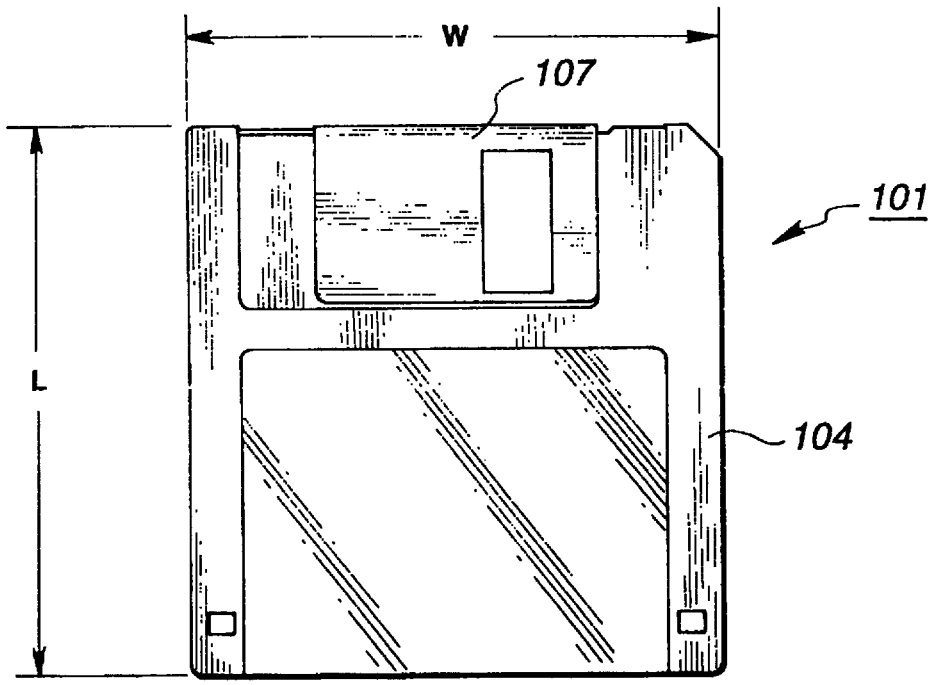
FIG. 1 shows a conventional disc cartridge looking from the upper cartridge half of the main cartridge body portion.
Figure 2:
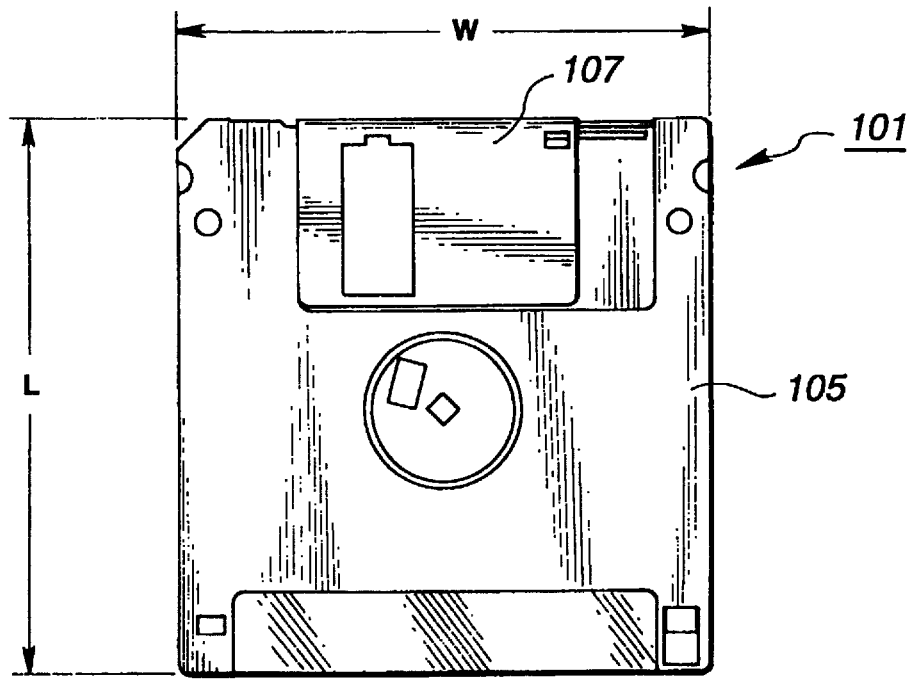
FIG. 2 shows the conventional disc cartridge looking from the lower cartridge half of the main cartridge body portion.
Figure 3:
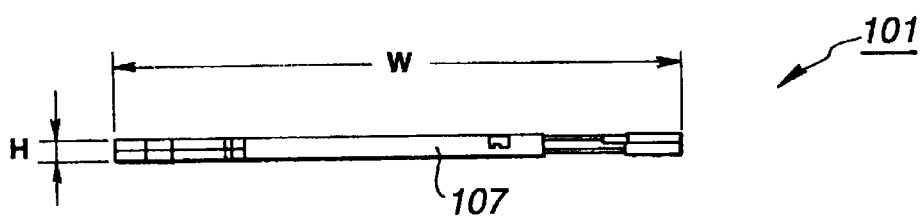
FIG. 3 shows the conventional disc cartridge looking from its front side.
Figure 4:
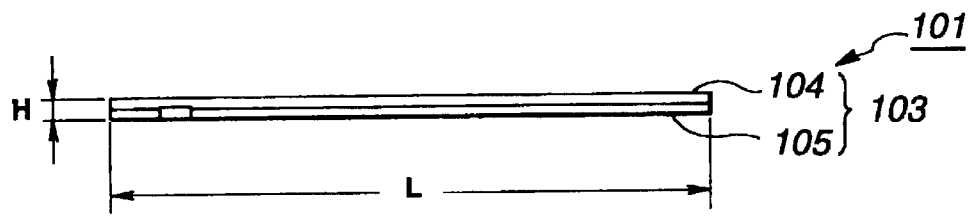
FIG. 4 is a side view showing the conventional disc cartridge.
Figure 5:
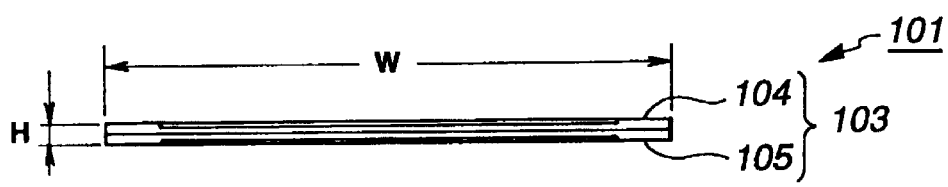
FIG. 5 shows the conventional disc cartridge looking from its rear side.
Figure 6:
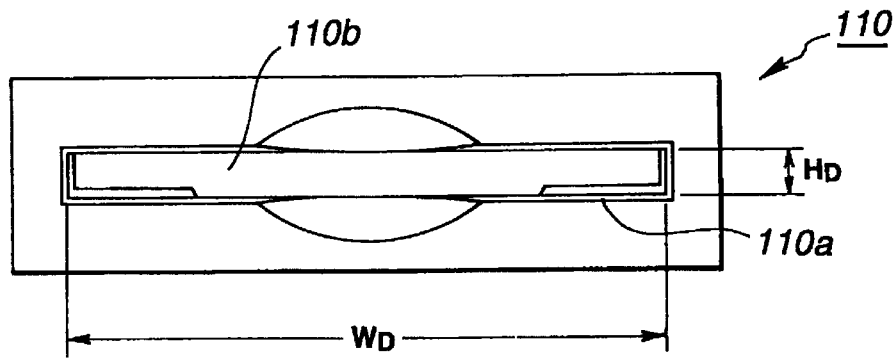
FIG. 6 is a front view showing a cartridge inserting aperture of the conventional recording/reproducing apparatus into which is loaded a conventional disc cartridge.
Figure 7:
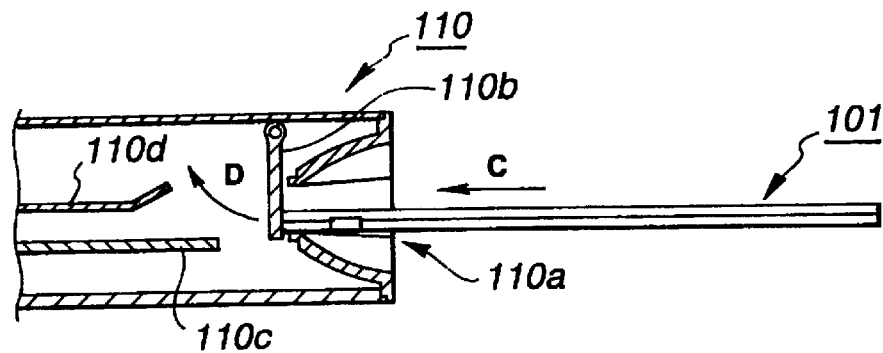
FIG. 7 is a longitudinal cross-sectional view showing the state of start of loading of the conventional disc cartridge into the recording/reproducing apparatus.
Figure 8:
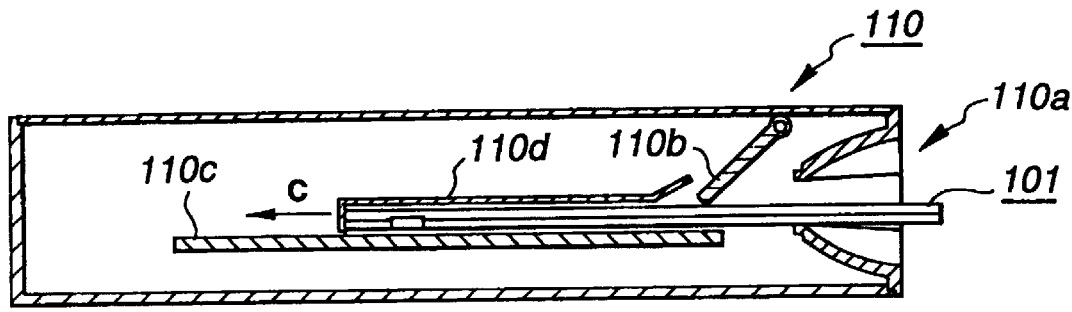
FIG. 8 is a longitudinal cross-sectional view showing the state of loading of the conventional disc cartridge into the recording/reproducing apparatus.
Figure 9:
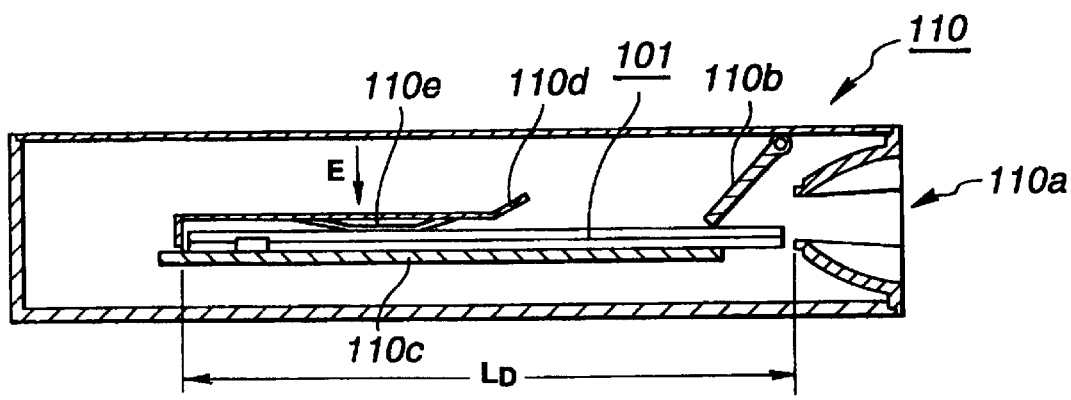
FIG. 9 is a longitudinal cross-sectional view showing the state of end of loading of the conventional disc cartridge into the recording/reproducing apparatus.

Referring to the drawings, first to eighth embodiments of a disc cartridge according to the present invention will be explained in detail. Each of the disc cartridges 1 to 8 is such a disc cartridge having a magnetic disc 11 of a diameter of 3.5 inches having a recording capacity for information signals of approximately 120 MB.

Figure 10:
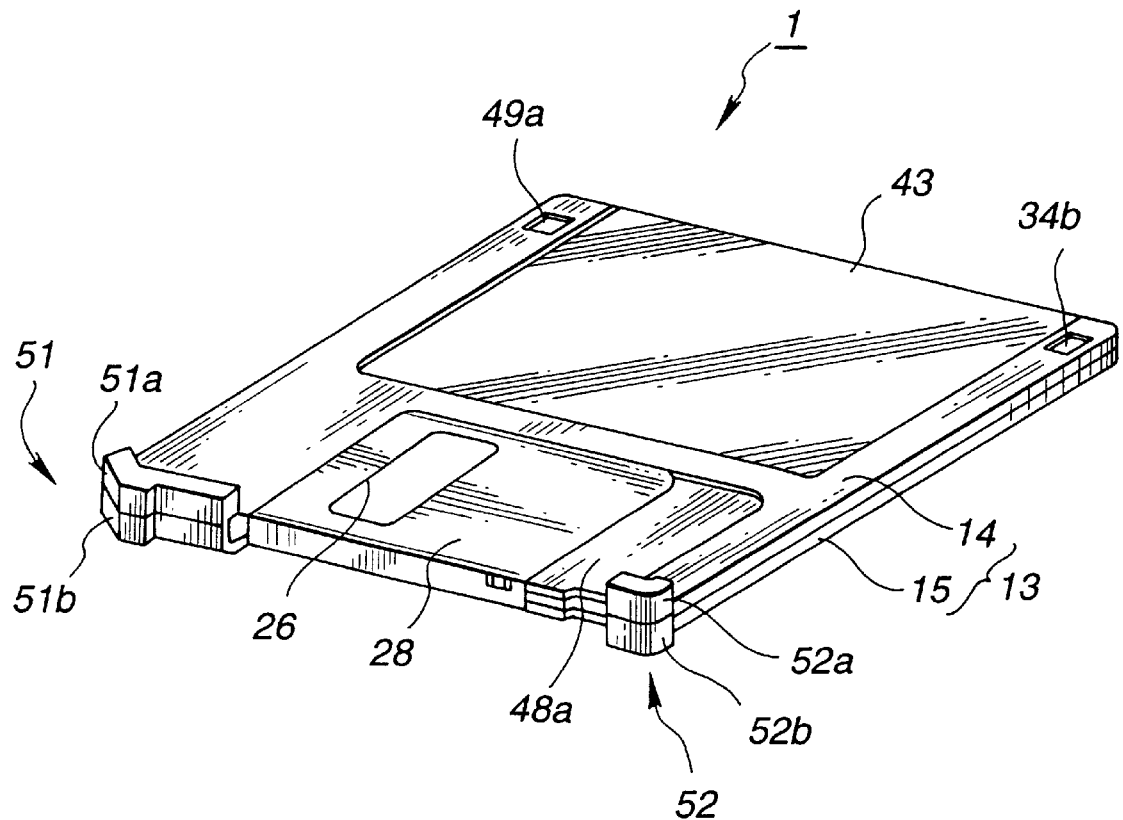
FIG. 10 is a perspective view showing a disc cartridge according to a first embodiment of the present invention.
Figure 11:
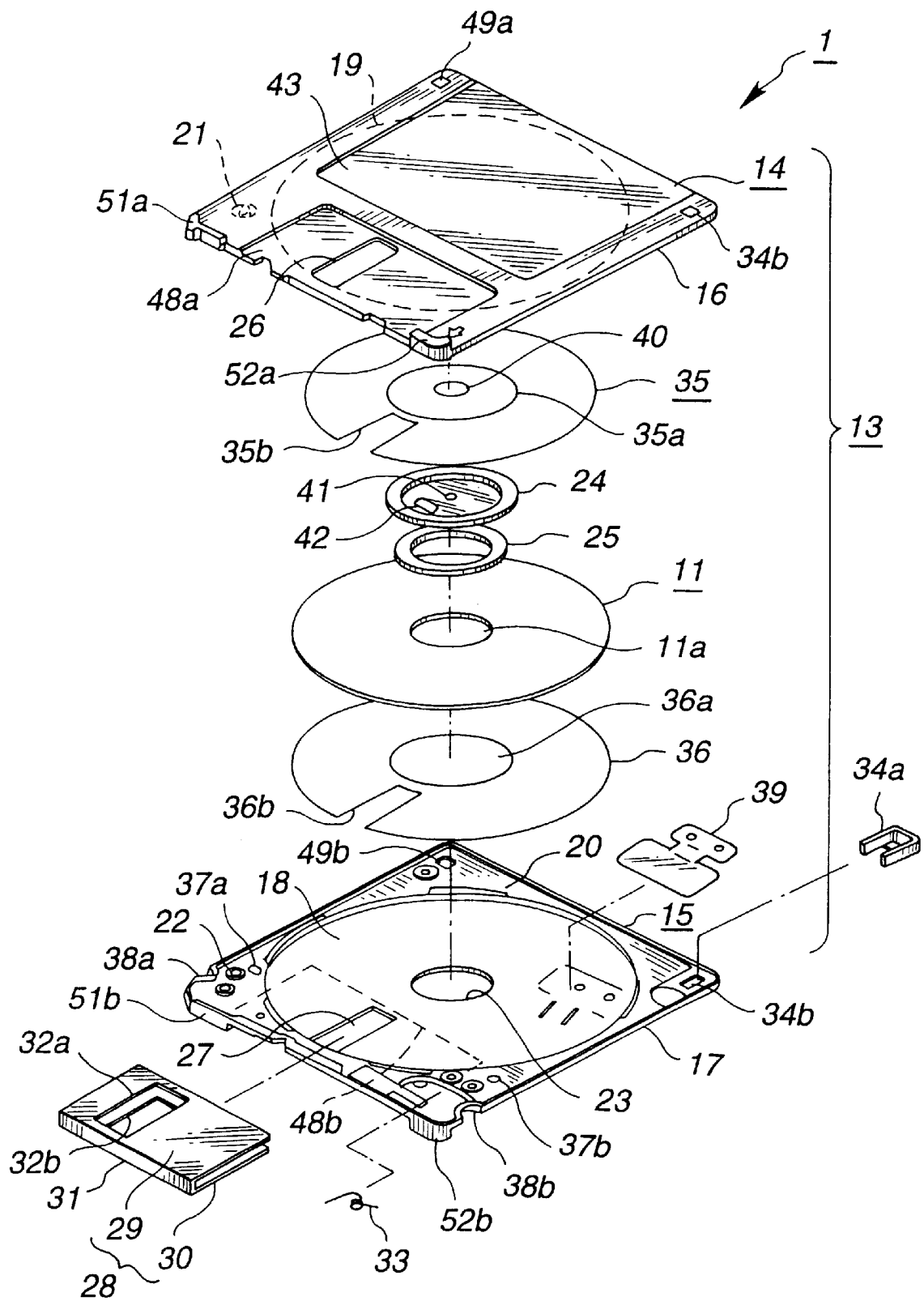
FIG. 11 is an exploded perspective view of the disc cartridge shown in FIG. 10.

Referring to FIGS. 10 and 11, a disc cartridge 1 of the first embodiment is made up of an upper cartridge half 14 and a lower cartridge half 15 abutted and connected to each other for constituting a generally thin box-shaped main cartridge body portion 13. The upper cartridge half and the lower cartridge half are each molded from a synthetic resin material and are each shaped as a square saucer of a shallow saucer.

On the outer rim portion of the upper cartridge half 14 and the lower cartridge half 15 are integrally formed upstanding peripheral wall sections 16, 17 abutted to each other for constituting an outer peripheral wall section of the main cartridge body portion 13. On facing inner wall sections of the upper cartridge half 14 and the lower cartridge half 15 are integrally formed upright disc housing forming wall sections 19, 20 and plural abutment fitting protrusions 21, 22. The disc housing forming wall sections 19, 20 are formed as plural wall sections substantially inscribing the upstanding peripheral wall sections 16, 17 and abutted to each other to form a circular disc housing 18.

Referring to FIGS. 10 and 11, the above-described upper cartridge half 14 and lower cartridge half 15 are assembled together, with the upstanding peripheral wall sections 16, 17 compressing against the disc housing forming wall sections 19, 20 and with the abutment fitting protrusions 21, 22 being fitted in position and welded by ultrasonic welding to complete the main cartridge body portion 13.

In the lower cartridge half 15 is formed a circular table entrance aperture 23 for constituting a central aperture of the disc housing 18. When the disc cartridge 1 is loaded in position on the recording/reproducing apparatus, a turntable provided on the apparatus for driving the magnetic disc 11 housed within the main cartridge body portion 13 is intruded into this table entrance aperture 23. By this table entrance aperture 23, a center hub 24 mounted via a mounting ring 25 for closing a central aperture 11a of the magnetic disc 11 housed within the main cartridge body portion 13 is exposed to outside via lower cartridge half 15.

The center hub 24 has a fitting portion of substantially the same diameter as a central aperture 11a of the magnetic disc 11 and a flange integrally formed on the outer periphery of the fitting portion and is formed substantially as a whole as a coupling. The center hub 24 is also provided with a spindle shaft opening spindle shaft opening 41 engaged by a spindle shaft of the recording/reproducing apparatus intruded via table entrance aperture 23 and a chuck hole 42 engaged by a chuck boss when the disc cartridge 1 is loaded in position on the recording/reproducing apparatus.

In the upper cartridge half 14 and in the lower cartridge half 15 are formed recording/reproducing apertures 26, 27 by which at least a portion of a signal recording area of the magnetic disc 11 housed within the disc housing 18 is exposed to outside the main cartridge body portion 13 across the inner and outer rims of the disc. These recording/reproducing apertures 26, 27 are rectangular in profile and are formed at a mid portion along the widths of the upper cartridge half 14 and the lower cartridge half 15 for extending from a position neighboring to the table entrance aperture 23 as far as the front side of the main cartridge body portion 13.

On the main cartridge body portion 13 is movably assembled a shutter member 28 made up of a pair of shutter portions 29, 30 and a connecting portion 31 interconnecting proximal ends of the shutter portions 29, 30. The shutter portions 29, 30 are molded from a synthetic resin material for facing each other. The shutter portions 29, 30 are formed with apertures 32a, 32b of substantially the same shape as the recording/reproducing apertures 26, 27.

In the forward portions of the upper cartridge half 14 and the lower cartridge half 15 are formed recesses for shutter movement 48a, 48b for extending around the recording/reproducing apertures 26, 27. Within these recesses for shutter movement 48a, 48b is movably mounted the shutter member 28.

The shutter member 28 is biassed by the spring force of a shutter spring 33 mounted on one corner on the forward end portion of the lower cartridge half 15 so that the apertures 32a, 32b are not in register with the recording/ reproducing apertures 26, 27. Thus, the shutter member 28 operates for preventing dust and dirt from being intruded via recording/reproducing apertures 26, 27 for becoming affixed to the magnetic disc 11 or damaging the magnetic disc 11 during non-use time of the disc cartridge 1.

Also, when the disc cartridge 1 is loaded on the recording/reproducing apparatus, a shutter driving member provided on the recording/reproducing apparatus moved along the front surface of the main cartridge body portion 13 is engaged with the shutter member 28 so that the shutter member 28 is moved along the main cartridge body portion 13 against the spring force of the shutter spring 33. This establishes the opening state with the apertures 32a, 32b in register with the recording/reproducing apertures 26, 27.

On one corner on the back side of the lower cartridge half 15 is movably assembled a mistaken erasure inhibiting member 34a for movement between a first position of opening a mistaken erasure detection hole 34b formed in the upper cartridge half 14 and the lower cartridge half 15 and a second position of closing the detection hole. If the disc cartridge 1 is loaded on the recording/reproducing apparatus with the mistaken erasure inhibiting member 34a moved to the first position of opening the mistaken erasure detection hole 34b, the mistaken erasure detection hole 34b is detected by mistaken erasure detection means on the side of the recording/reproducing apparatus for inhibiting recording of information signals on the magneto-optical disc 11. Thus, the disc cartridge 1 inhibits mistaken erasure of information signals recorded on the magneto-optical disc 11. With the mistaken erasure inhibiting member 34a moved to the second position of closing the mistaken erasure detection hole 34b, the mistaken erasure detection hole 34b is not detected by the mistaken erasure detection means, so that information signals can be recorded on the magneto-optical disc 11.

Between the inner wall section and the magnetic disc 11 and between the inner wall section of the lower cartridge half 15 and the magnetic disc 11 are mounted an upper liner 35 and a lower liner 36, respectively, secured to the upper cartridge half 14 and the lower cartridge half 15, respectively. The upper liner 35 and the lower liner 36 are annular and substantially equal in diameter to the magnetic disc 11. The liners 35, 36 are formed with center apertures 35a, 35b, respectively, larger in diameter than the center aperture 11a of the magnetic disc 11. The upper liner 35 and the lower liner 36 are also formed with radial cut-outs 35b, 36b extending from the outer periphery to near-by portions of the center apertures 35a, 35b, respectively. These radial cut-outs 35b, 36b are slightly larger in size than the recording/reproducing apertures 26, 27 formed in the upper cartridge half 14 and the lower cartridge half 15, respectively.

At a mid portion on the inner wall section of the upper cartridge half 14 is protuberantly formed an annular rib, not shown, in register with the table entrance aperture 23 of the lower cartridge half 15. The diameter of the annular rib is slightly smaller than the inner diameter of the center hub 24 of the magnetic disc 11. The annular rib is of a height slightly smaller than the height of the upstanding peripheral wall sections 16, 17 abutted to each other for making up the outer peripheral wall of the disc cartridge 1. Thus, when the upper cartridge half 14 and the lower cartridge half 15 are combined together, the annular rib is extended along the inner peripheral wall section of the center hub 24 with respect to the magnetic disc 11 rotatably housed within the main cartridge body portion 13. The magnetic disc 11 can be smoothly rotated within the interior of the main cartridge body portion 13 by the inner peripheral wall section of the center hub 24 being regulated in its entirety by the annular rib for preventing idle movement in both the direction of diameter and the direction of thickness.

On the lower cartridge half 15 is assembled and secured a lifter formed by warping a sheet material of synthetic resin substantially in a chevron shape. This lifter 39 operates by thrusting the lower liner 36 against the lower surface of the magnetic disc 11 by an upstanding end section thereof upwardly thrusting the lower surface of the lower liner 36 fixedly welded to the inner wall of the lower cartridge half 15. At a mid portion of the inner wall of the upper cartridge half 14 is secured a center plate 40 molded from an abrasion-resistant synthetic resin material. When the disc cartridge 1 is loaded on the recording/reproducing apparatus, the center plate 40 operates for regulating the abutting height of the spindle shaft of the turntable intruded via table entrance aperture 23 formed in the lower cartridge half 15, while operating as a support for the upper surface of the center hub 24 assembled in the center aperture 11a of the magnetic disc 11 for preventing abrasion and damage to the upper cartridge half 14.

When the disc cartridge 1 is loaded on the recording/reproducing apparatus and the recording or reproducing operation proceeds, with the magnetic disc 11 being run in rotation, the upper liner 35 and the lower liner 36 are slidingly contacted with the upper and lower surfaces of the magnetic disc 11 for assuring smooth rotation of the disc free of rotational fluctuations.

On the major surface of the lower cartridge half 15 are formed a pair of positioning holes 37a, 37b for positioning the disc cartridge with respect to the cartridge loading section of the recording/reproducing apparatus. When the disc cartridge 1 is inserted into the recording/reproducing apparatus, positioning protrusions formed on the apparatus are intruded into the positioning holes 37a, 37b for positively setting the position of the disc cartridge relative to the cartridge loading section.

In both lateral surfaces of the lower cartridge half 15 parallel to the direction of insertion of the main cartridge body portion 13 into the recording/reproducing apparatus are formed grip recesses 38a, 38b, semi-circular in cross-section, respectively. These grip recesses 38a, 38b are used for gripping the main cartridge body portion 13 during automatic loading by the recording/reproducing apparatus or during automatic disc cartridge exchange operations.

In the major surfaces of the upper cartridge half 14 and the lower cartridge half 15 are formed recessed label areas in which to bond labels indicating the recording contents of the information signals recorded on the magnetic disc 11.

On one corner of the rear end of the upper cartridge half 14 and the lower cartridge half 15 are formed specifications-discrimination holes 49a, 49b for discriminating the specifications, such as recording capacity, of the magnetic disc 11. The specifications-discrimination holes 49a, 49b of the disc cartridge 1 are detected by specifications discrimination means provided on the recording/reproducing apparatus for identifying the particular specifications of the disc cartridge 1.

Figure 12:
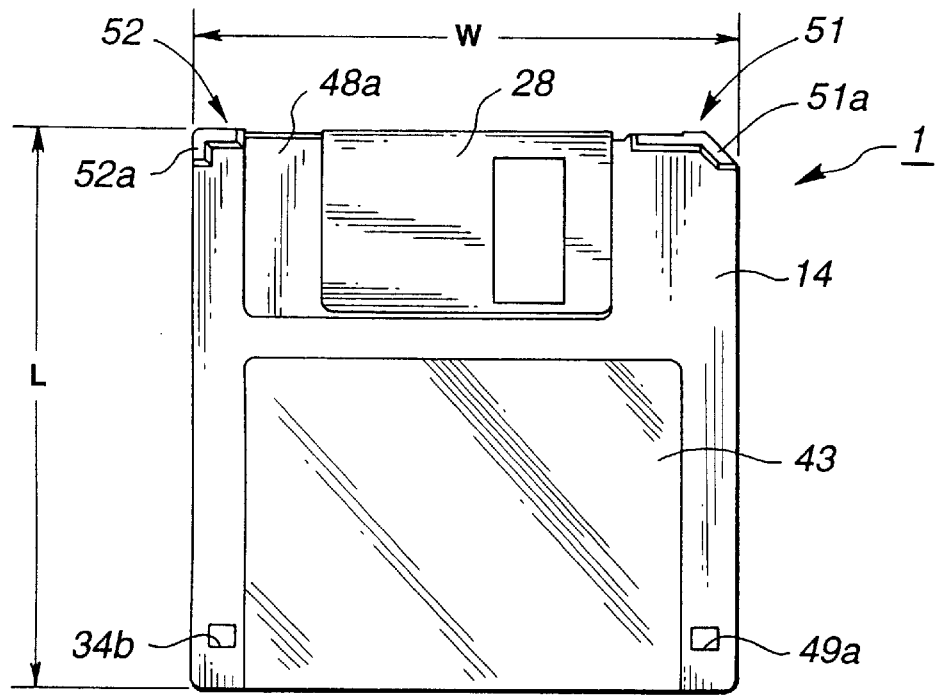
FIG. 12 is a plan view showing the disc cartridge of FIG. 10 looking from the side of the upper cartridge half of the main cartridge body portion.
Figure 13:
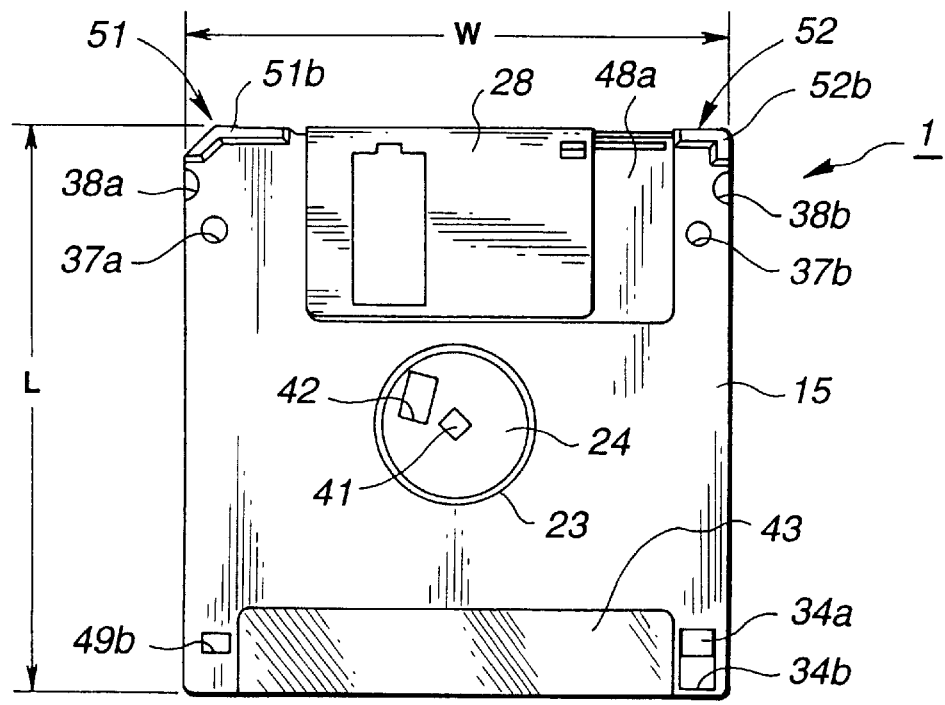
FIG. 13 is a plan view showing the disc cartridge of FIG. 10 looking from the side of the lower cartridge half of the main cartridge body portion.
Figure 14:
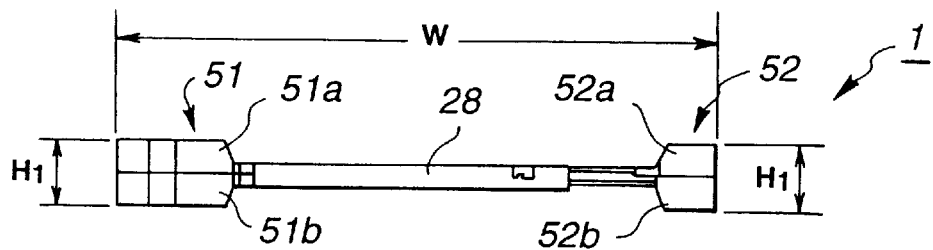
FIG. 14 shows the disc cartridge of FIG. 10 looking from its front side.
Figure 15:
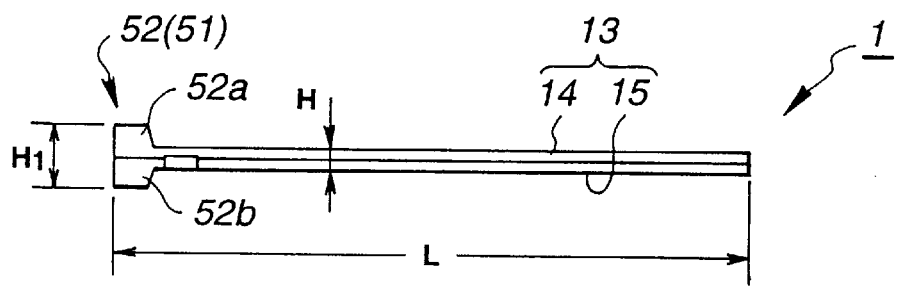
FIG. 15 is a side view showing the disc cartridge of FIG. 10.
Figure 16:
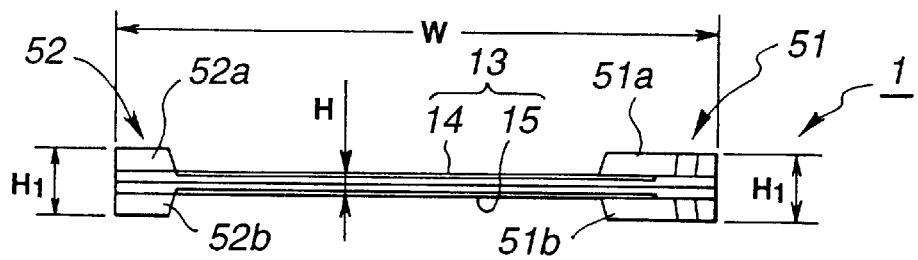
FIG. 16 shows the disc cartridge of FIG. 10 looking from its rear side.

At the front side corners as the inserting ends of the upper cartridge half 14 and the lower cartridge half 15 of the main cartridge body portion 13 of the first embodiment of the disc cartridge 1 for the recording/reproducing apparatus are formed insertion regulating sections 51, 52 for regulating mistaken insertion of the disc cartridge into the above-mentioned conventional recording/reproducing apparatus, as shown in FIGS. 12 and 13. These insertion regulating sections 51, 52 are formed by regulating protrusions 51*a*, 52*a* formed protuberantly along the corners of the forward end portions of the upper cartridge half 14 and by regulating protrusions 51*b*, 52*b* formed protuberantly along the corners of the forward end portions of the lower cartridge half 15.

That is, with the main cartridge body portion 13, the height $H_1$ which is the thickness of the insertion regulating sections 51, 52 is set so as to be larger than the height H which is the thickness of the major surface section. The height $H_1$ of the insertion regulating sections 51, 52 formed on the main cartridge body portion 13 is set to a pre-set value satisfying the relation $$H_1>(2.5\times H)\geq H_D \tag{1}$$

where $H_D$ is the height of the cartridge inserting aperture 110*a* of the conventional recording/reproducing apparatus 110 and H is the height of the major surface of the main cartridge body portion 13. The reason is that the height $H_D$ of the major surface section of the of the cartridge inserting aperture 110*a* of the conventional disc cartridge 101 is set so as to be 2 to 2.5 times as large as the height H of the major surface section of the main cartridge body portion 103.

Figure 17:
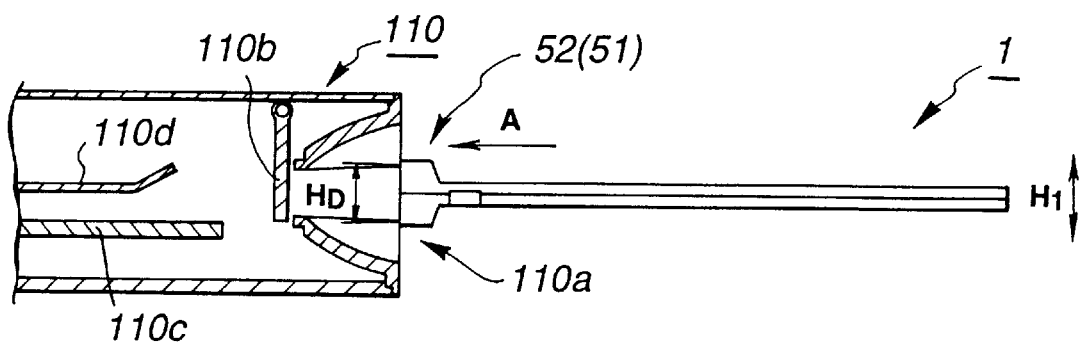
FIG. 17 is a longitudinal cross-sectional view showing the state in which the disc cartridge of FIG. 10 has been inserted into the recording/reproducing apparatus.

The state in which the above-described first embodiment of the disc cartridge is inserted not the conventional recording/reproducing apparatus 110 is explained by referring to FIG. 17. Meanwhile, the above-described conventional recording/reproducing apparatus 110 has the cartridge inserting aperture 110*a* into which is inserted the conventional disc cartridge 101, as shown for example in FIG. 17. This recording/reproducing apparatus 110 includes, in the cartridge loading section into which is intruded the conventional disc cartridge 101, a base plate 110*c* on which is set the disc cartridge 101 inserted from the cartridge inserting aperture 110*a*, and a holder member 110*d* in which is housed the inserted disc cartridge 101.

If the disc cartridge 1 is inserted in a direction A via cartridge inserting aperture 110*a* of the conventional recording/reproducing apparatus 110, the insertion regulating sections 51, 52 are abutted against the opening edge of the cartridge inserting aperture 110*a*, because the height $H_1$ of the insertion regulating sections 51, 52 of the main cartridge body portion 13 is larger than the height $H_D$ of the cartridge inserting aperture 110*a* of the conventional recording/reproducing apparatus 110. Thus, the disc cartridge 1 cannot be inadvertently inserted into the conventional recording/reproducing apparatus 10 by the insertion regulating sections 51, 52.

With the main cartridge body portion 13 of the above-described disc cartridge 1, the regulating protrusions 51*a*, 51*b*, 52*a*, 52*b* of uniform thickness are formed on the upper cartridge half 14 and on the lower cartridge half 15, respectively. However, these regulating protrusions may also be provided on only one of the upper cartridge half 14 and the lower cartridge half 15, for realization of the similar results, if the height $H_1$ of the insertion regulating sections 51, 52 by the regulating protrusions of one of the cartridge halves is set so as to satisfy the above equation 1. Although the insertion regulating sections 51, 52 are formed at each corner of the forward end of the main cartridge body portion 13, these insertion regulating portions may also be provided on only one corner for realization of the similar effect.

With the above-described first embodiment of the disc cartridge 1, provision of the insertion regulating sections 51, 52 on the main cartridge body portion 13 leads to positive prevention of mistaken insertion of the disc cartridge 1 into the conventional recording/reproducing apparatus 110. Thus it is possible with the present disc cartridge 1 to prevent insertion of the disc cartridge 1 into the conventional recording/reproducing apparatus 110 to lead to destruction of the information signals recorded on the magnetic disc 11.

Referring to FIGS. 18 to 22, a disc cartridge 2 of the second embodiment is explained. Since the present disc cartridge 2 is basically the same in structure as the above-described disc cartridge 1 except provision of insertion regulating portions 56, 57, the same components are denoted by the same reference numerals and the corresponding description is omitted for simplicity.

Figure 18:
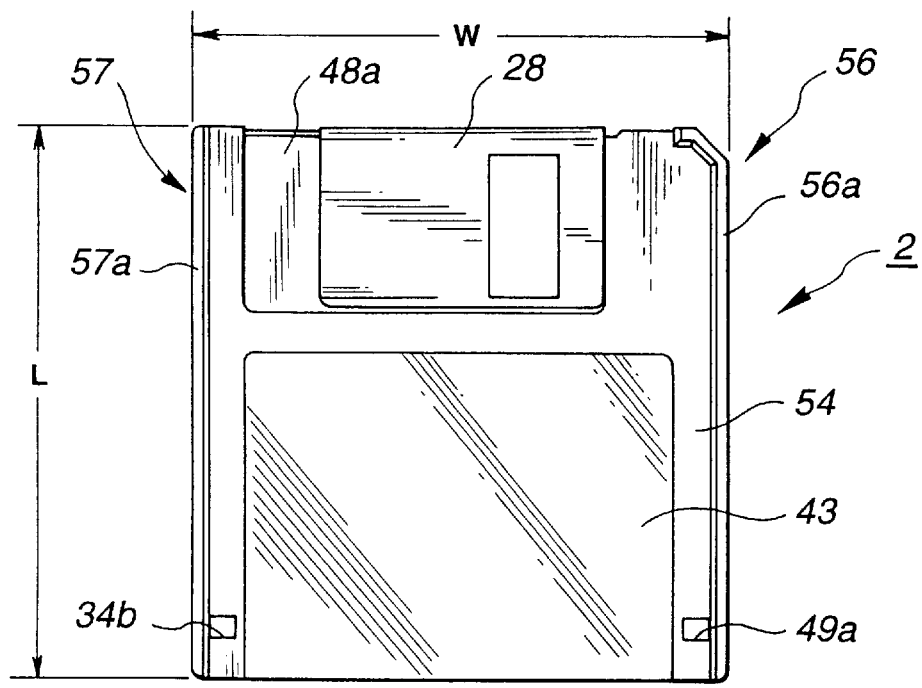
FIG. 18 is a plan view showing a disc cartridge of a second embodiment looking from the upper cartridge half of the main cartridge body portion.
Figure 19:
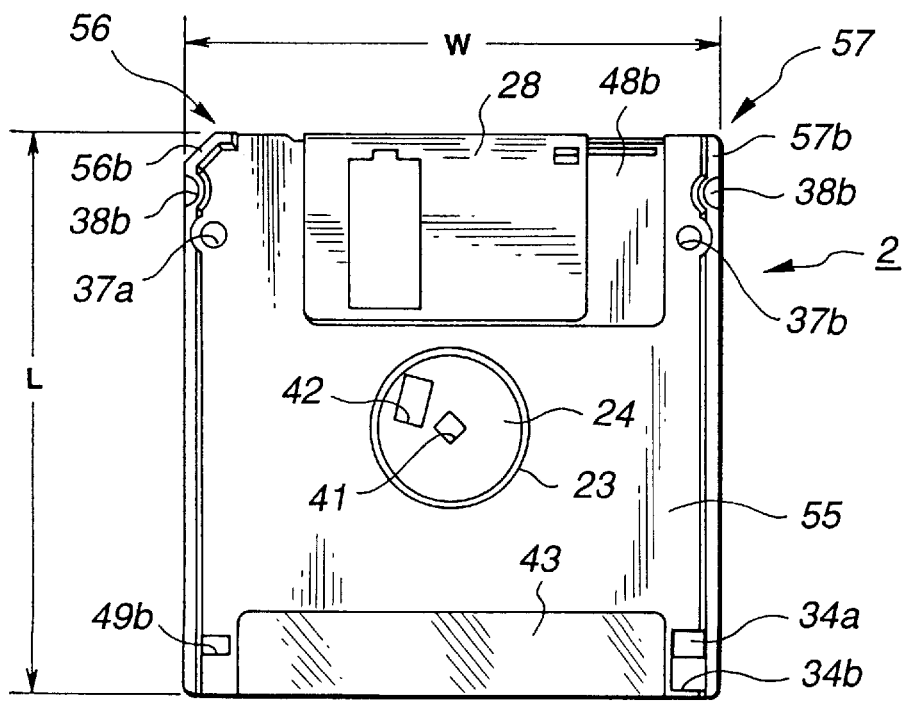
FIG. 19 is a plan view showing the disc cartridge of the second embodiment looking from the lower cartridge half of the main cartridge body portion.

Referring to FIGS. 18 and 19, an upper cartridge half 54 and a lower cartridge half 55 making up a main cartridge body portion 53 of the disc cartridge 2 are formed with insertion regulating portions insertion regulating portions 56, 57, on both lateral sides thereof parallel to the direction of insertion into the recording/reproducing apparatus, for preventing inadvertent insertion of the disc cartridge 2 into the conventional recording/reproducing apparatus 110. Referring to FIGS. 18 and 19, these insertion regulating units 56, 57 are formed with regulating protrusions 56*a*, 57*a* formed integrally protuberantly along both lateral sides of the upper cartridge half 54 and with regulating protrusions 56*b*, 57*b* formed integrally protuberantly along both lateral sides of the lower cartridge half 55.

Referring to FIG. 19, the regulating protrusions 56*b*, 57*b* of the lower cartridge half 57 are arcuately cut out in the regions thereof neighboring to the positioning holes 37*a*, 37*b* for not obstructing positioning by these positioning holes 37*a*, 37*b*. On both lateral surfaces of the regulating protrusions 56*b*, 57*b* of the lower cartridge half 55 are formed grip recesses 38*a*, 38*b*, which are semi-circular in cross-section. These grip recesses 38*a*, 38*b* are used for gripping the main cartridge body portion 53 during automatic loading by the recording/reproducing apparatus or during automatic disc cartridge exchange operations.

Figure 20:
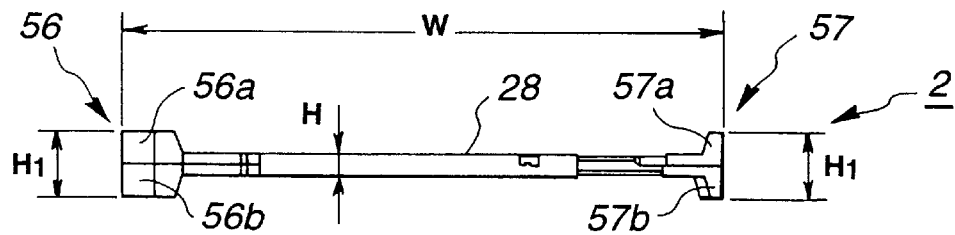
FIG. 20 shows the disc cartridge of FIG. 18 looking from its front side.
Figure 21:
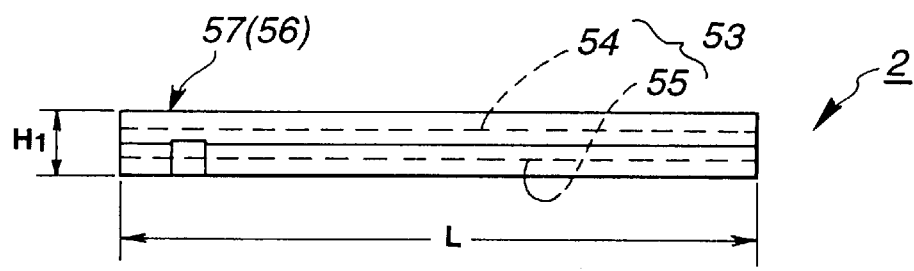
FIG. 21 is a side view showing the disc cartridge of FIG. 18.
Figure 22:
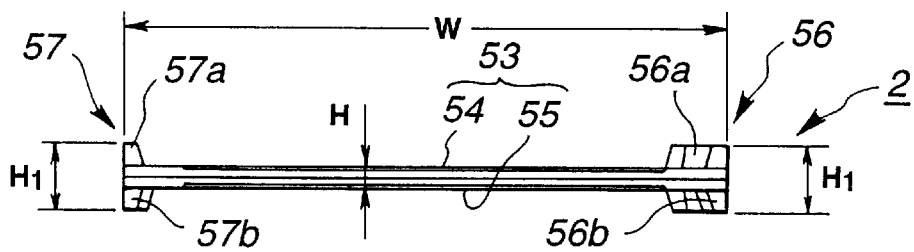
FIG. 22 shows the disc cartridge of FIG. 18 looking from its rear side.

That is, with the main cartridge body portion 53, the height $H_1$ which is the thickness of the insertion regulating sections 56, 57, is set so as to be larger than the height H which is the thickness of the major surface section, as shown in FIGS. 20 to 22. The height $H_1$ of the insertion regulating sections 56, 57 formed on the main cartridge body portion 53 is set to a pre-set value satisfying the relation $$H>(2.5\times H)\geq H_D \tag{1}$$

where $H_D$ is the height of the cartridge inserting aperture 110*a* of the conventional recording/reproducing apparatus 110 and H is the height of the major surface of the main cartridge body portion 13. The reason is that the height $H_D$ of the major surface section of the cartridge inserting aperture 110*a* of the conventional disc cartridge 101 is set so as to be 2 to 2.5 times as large as the height H of the major surface section of the main cartridge body portion 103.

Figure 23:
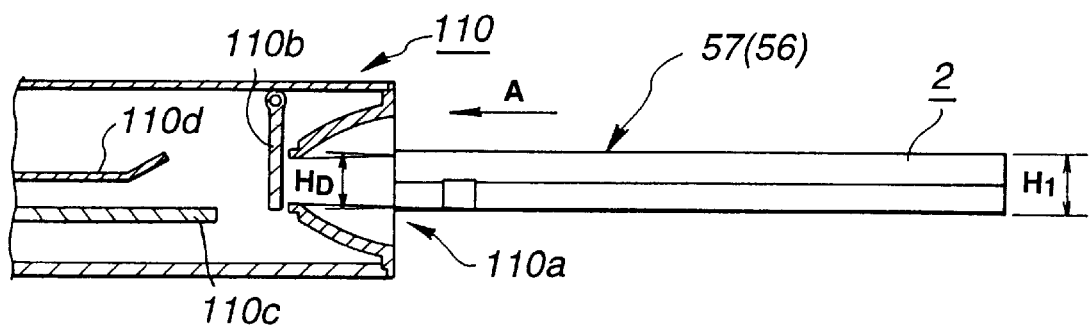
FIG. 23 is a longitudinal cross-sectional view showing the state in which the disc cartridge of FIG. 18 has been inserted into the recording/reproducing apparatus.

With the above-described second embodiment of the disc cartridge 2, if it is attempted to insert the disc cartridge 2 via cartridge inserting aperture 110*a* of the conventional recording/reproducing apparatus 110 in the direction indicated by arrow A in FIG. 23, the insertion regulating units insertion regulating units 56, 57 are abutted against the opening edge of the cartridge inserting aperture 110*a* of the conventional recording/reproducing apparatus 110 to disable the insertion. It is because the height $H_1$ of the insertion regulating units 56, 57 of the main cartridge body portion 53 is set so as to be larger than the height $H_D$ of the cartridge inserting aperture 110*a*. Thus, the present disc cartridge 2 can be prevented by the insertion regulating units 56, 57 from being inadvertently inserted into the conventional recording/reproducing apparatus 110.

With the main cartridge body portion 53 of the above-described disc cartridge 2, the regulating protrusions 56a, 56b, 57a, 57b of uniform thickness are formed on the upper cartridge half 54 and on the lower cartridge half 55, respectively. However, these regulating protrusions may also be provided on only one of the upper cartridge half 54 and the lower cartridge half 55, for realization of the similar results, if the height $H_1$ of the insertion regulating sections 56, 57 by the regulating protrusions of one of the cartridge halves is set so as to satisfy the above equation 1. Although the insertion regulating sections 56, 57 are formed at each corner of the forward end of the main cartridge body portion 53, these insertion regulating portions may also be provided on only one corner for realization of the similar effect.

Referring to FIGS. 24 to 28, a disc cartridge 3 of the third embodiment is explained. Since the present disc cartridge 3 is basically the same in structure as the above-described disc cartridge 1 except provision of an insertion regulating portion 61, the same components are denoted by the same reference numerals and the corresponding description is omitted for simplicity.

Figure 24:
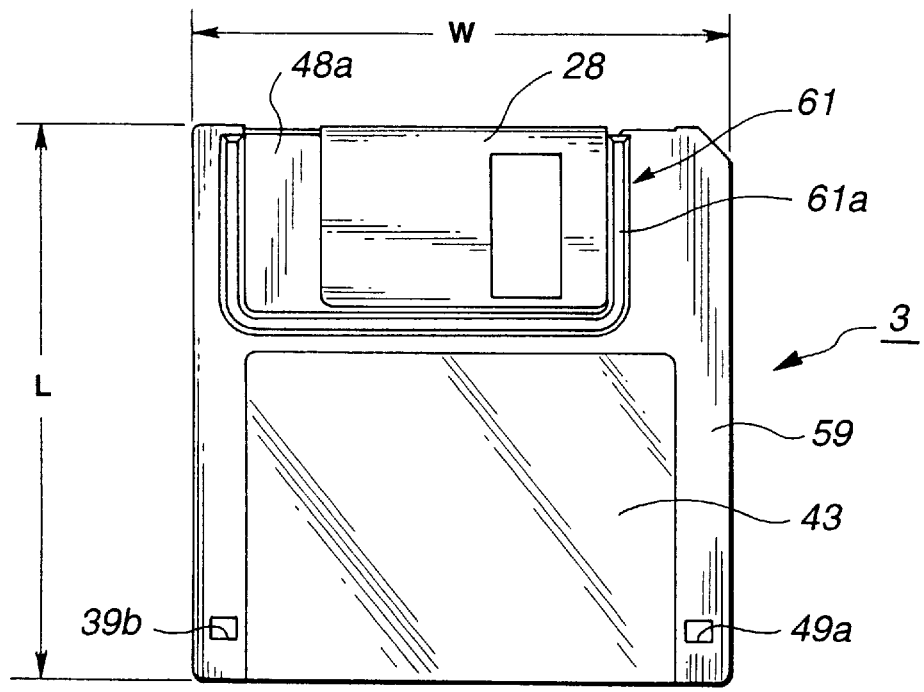
FIG. 24 is a plan view showing a disc cartridge of a third embodiment looking from the upper cartridge half of the main cartridge body portion.
Figure 25:
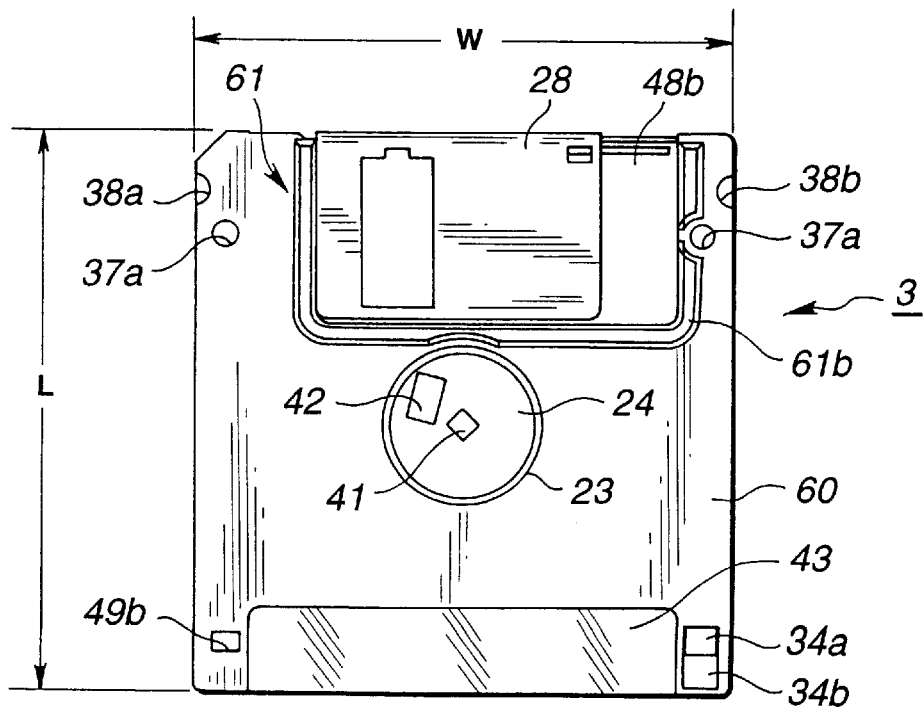
FIG. 25 is a bottom view showing the disc cartridge of FIG. 24 looking from the lower cartridge half of the main cartridge body portion.

Referring to FIGS. 24 and 25, an upper cartridge half 59 and a lower cartridge half 60 making up a main cartridge body portion 58 of the disc cartridge 3 are formed with the insertion regulating portion 61 for preventing inadvertent insertion of the disc cartridge 2 into the conventional recording/reproducing apparatus 110. The insertion regulating portion 61 is formed for extending along the outer rim of the recess for shutter movement 48a formed on the inserting end into the recording/reproducing apparatus.

Referring to FIGS. 24 and 25, the insertion regulating portion 61 is made up of a substantially U-shaped regulating lug 61a formed integrally protuberantly along the outer rim of the recess for shutter movement 48a of the upper cartridge half 59 and a substantially U-shaped regulating lug 61b formed integrally protuberantly along the outer rim of the recess for shutter movement 48b of the lower cartridge half 60.

Referring to FIG. 25, the regulating lug 61b of the lower cartridge half 60 is arcuately cut out in the regions thereof neighboring to the positioning hole 37, for not obstructing positioning by thee positioning holes 37a. On the other hand, the regulating lug 61b of the lower cartridge half 60 is arcuately cut out in the regions thereof neighboring to the table entrance aperture 23 for not obstructing intrusion of the turntable of the recording/reproducing apparatus.

Figure 26:
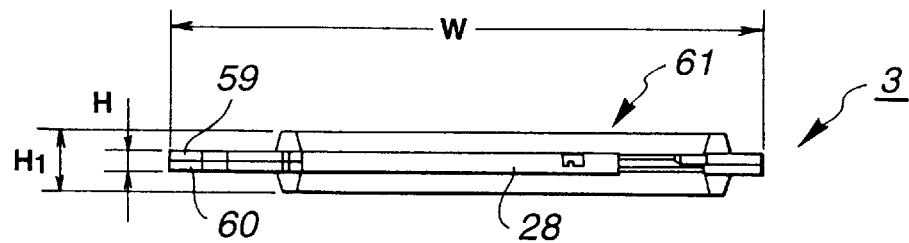
FIG. 26 shows the disc cartridge of FIG. 24 looking from its front side.
Figure 27:
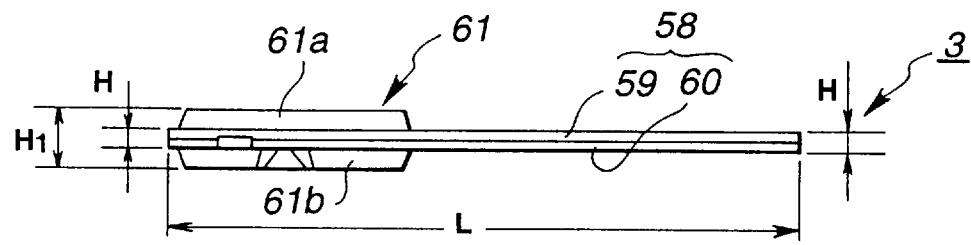
FIG. 27 is a side view showing the disc cartridge of FIG. 24.
Figure 28:
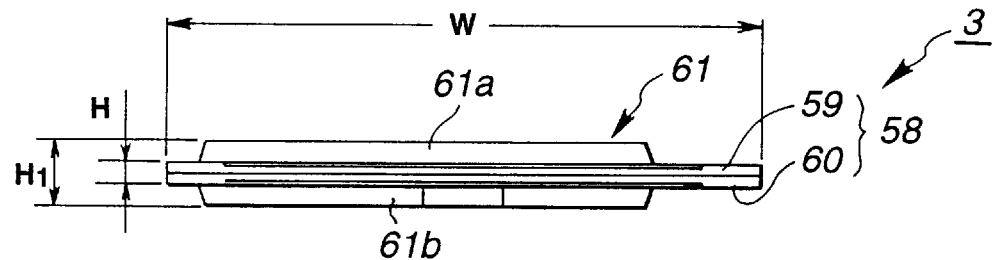
FIG. 28 shows the disc cartridge of FIG. 24 looking from its rear side.

With the main cartridge body portion 58, the height $H_1$ which is the thickness of the insertion regulating portion 61 is set so as to be larger than the height H which is the thickness of the major surface section, as shown in FIGS. 26 to 28. The height $H_1$ of the insertion regulating portion 61 formed on the main cartridge body portion 58 is set to a pre-set value satisfying the relation $$H>(2.5\times H)\geq H_D \tag{1}$$

where $H_D$ is the height of the cartridge inserting aperture 110a of the conventional recording/reproducing apparatus 110 and H is the height of the major surface of the main cartridge body portion 13. The reason is that the height $H_D$ of the cartridge inserting aperture 110a of the conventional disc cartridge 101 is set so as to be 2 to 2.5 times as large as the height H of the major surface section of the main cartridge body portion 103.

Figure 29:
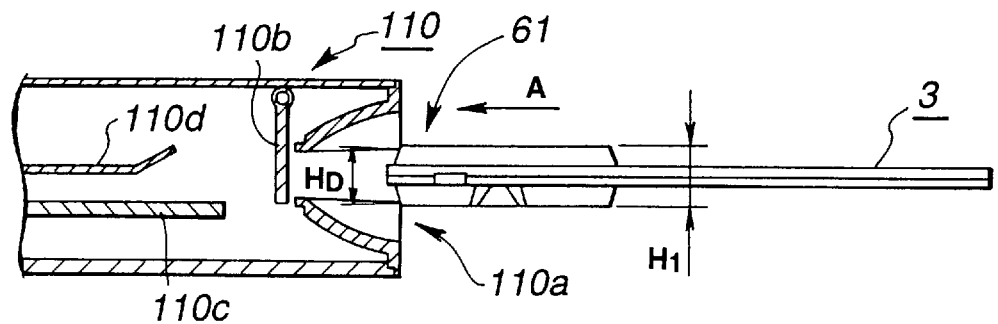
FIG. 29 is a longitudinal cross-sectional view showing the state in which the disc cartridge of FIG. 24 has been inserted into the recording/reproducing apparatus.

With the above-described third embodiment of the disc cartridge 3, if it is attempted to insert the disc cartridge 3 via cartridge inserting aperture 110a of the conventional recording/reproducing apparatus 110, as shown in FIG. 29, the insertion regulating portion 61 abutted against the opening edge of the cartridge inserting aperture 110a to disable the insertion because the height $H_1$ of the insertion regulating portion 61 of the main cartridge body portion 58 is set so as to be larger than the height $H_D$ of the cartridge inserting aperture 110a. Thus, the present disc cartridge 2 can be prevented by the insertion regulating portion 61 from being inadvertently inserted into the conventional recording/reproducing apparatus 110.

With the main cartridge body portion 58 of the above-described disc cartridge 3, the regulating protrusions 61a, 61b of uniform height are formed on each of the upper cartridge half 59 and lower cartridge half 60. However, the regulating lug may also be provided on only one of the upper cartridge half 59 and the lower cartridge half 60, for realization of the similar results, if the height $H_1$ of the insertion regulating 61 by one of the regulating protrusions is set so as to satisfy the above equation 1. Although the insertion regulating protrusions are formed for extending along the outer rims of the recesses for shutter movement 48a, 48b, the regulating protrusions may also be formed on only portions of the recesses for shutter movement 48a, 48b for realization of the similar effect.

Referring to FIGS. 30 to 34, a disc cartridge 4 of the fourth embodiment is explained. Since the present disc cartridge 4 is basically the same in structure as the above-described disc cartridge 1 except provision of an insertion regulating portion 65, the same components are denoted by the same reference numerals and the corresponding description is omitted for simplicity.

Figure 30:
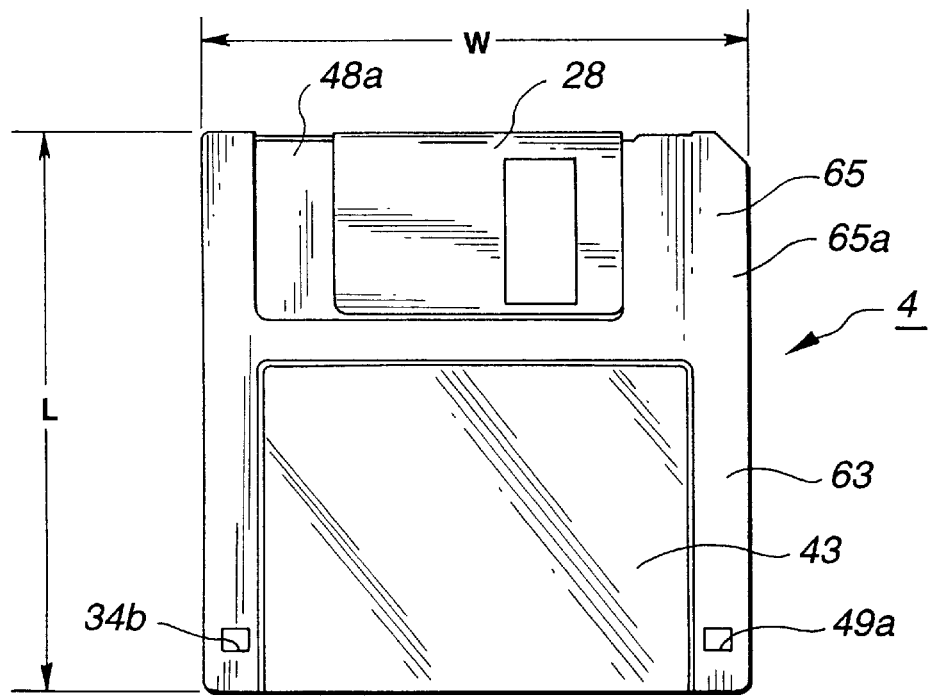
FIG. 30 is a plan view showing a disc cartridge of a fourth embodiment looking from the upper cartridge half of the main cartridge body portion.
Figure 31:
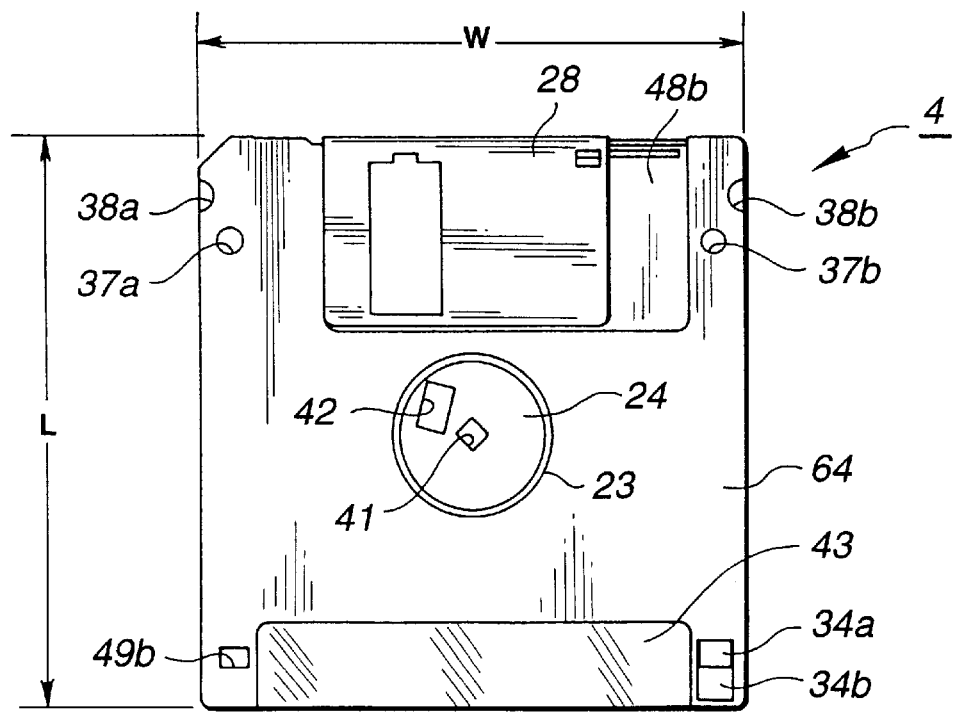
FIG. 31 is a plan view showing the disc cartridge of the fourth embodiment looking from the lower cartridge half of the main cartridge body portion.

Referring to FIGS. 30 and 31, an upper cartridge half 63 constituting a main cartridge body portion 62 of the disc cartridge 4 has, on its major surface, a substantially H-shaped insertion regulating portion 65 for regulating mistaken insertion into the conventional recording/reproducing apparatus 110.

Referring to FIGS. 30 and 31, this insertion regulating portion 65 is comprised of a substantially H-shaped regulating protrusion 65a protuberantly formed as one with the major surface of the upper cartridge half 63 excluding the shutter movement recess 48a, in which the shutter member 28 is moved, and a label area 43 in which to bond a display label indicating the information recording contents.

Referring to FIG. 30, towards the rear end of the inside of the regulating protrusion 65a of the upper cartridge half 63 are formed the specifications discrimination hole 49a and mistaken erasure inhibiting hole 34b.

Figure 32:
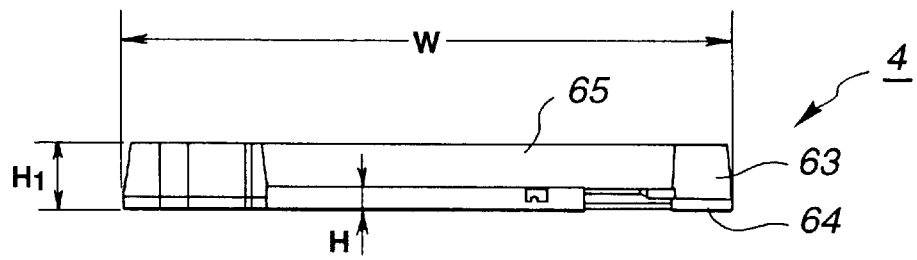
FIG. 32 shows the disc cartridge of FIG. 30 looking from its front side.
Figure 33:
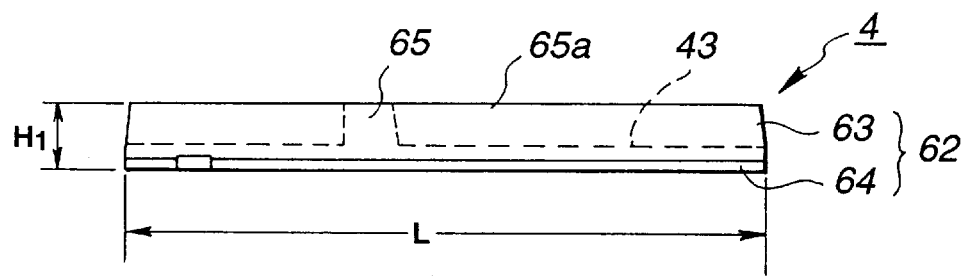
FIG. 33 is a side view showing the disc cartridge of FIG. 30.
Figure 34:
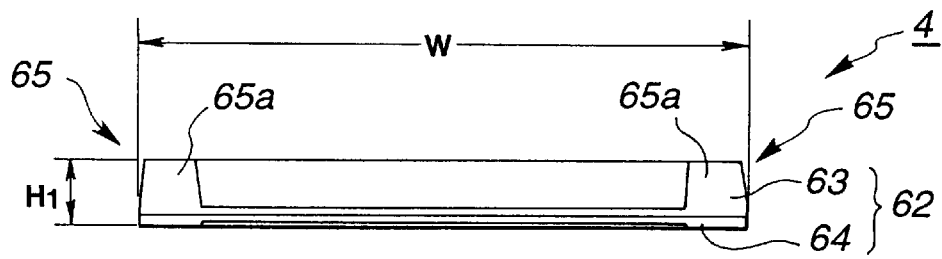
FIG. 34 shows the disc cartridge of FIG. 30 looking from its rear side.
Figure 35:
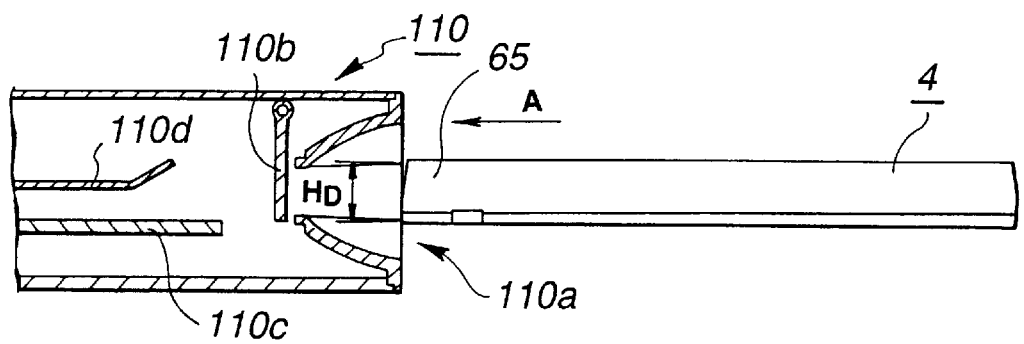
FIG. 35 is a longitudinal cross-sectional view showing the state in which the disc cartridge of FIG. 30 has been inserted into the recording/reproducing apparatus.

In the upper cartridge half 63 of the main cartridge body portion 62, the height $H_1$ which is the thickness of the insertion regulating portion 61 is set so as to be larger than the height H which is the thickness of the major surface section, as shown in FIGS. 32 and 33. The height $H_1$ of the insertion regulating portion 61 formed on the main cartridge body portion 62 is set to a pre-set value satisfying the relation $$H_1>(2.5\times H)\geq H_D \tag{1}$$

where $H_D$ is the height of the cartridge inserting aperture 110a of the conventional recording/reproducing apparatus 110 and H is the height of the major surface of the main cartridge body portion 103. The reason is that the height $H_D$ of the cartridge inserting aperture 110a of the conventional disc cartridge 101 is set so as to be 2 to 2.5 times as large as the height H of the major surface section of the main cartridge body portion 103.

With the above-described fourth embodiment of the disc cartridge 4, if it is attempted to insert the disc cartridge 4 via cartridge inserting aperture 110a of the conventional recording/reproducing apparatus 110, as shown in FIG. 29, the insertion regulating portion 61 is abutted against the opening edge of the cartridge inserting aperture 110a to disable the insertion because the height $H_1$ of the insertion regulating portion 61 of the main cartridge body portion 62 is set so as to be larger than the height $H_D$ of the cartridge inserting aperture 110a. Thus, the present disc cartridge 2 can be prevented by the insertion regulating portion 61 from being inadvertently inserted into the conventional recording/reproducing apparatus 110.

In the upper cartridge half 63 of the disc cartridge 4, the regulating protrusion 65a is protuberantly formed in an area excluding the label area 43. It is however possible to form the protrusion in the label area 43 so that the label area 43 is of the same height as the regulating protrusion 65a.

Meanwhile, the upper cartridge half 64 of the main cartridge body portion 6 of the disc cartridge 4 is of the same outer size as the lower cartridge half 104 of the conventional disc cartridge 101.

Referring to FIGS. 36 to 40, a disc cartridge 5 of the fifth embodiment is explained. Since the present disc cartridge 5 is basically the same in structure as the above-described disc cartridge 1 except provision of an insertion regulating portion 70, the same components are denoted by the same reference numerals and the corresponding description is omitted for simplicity.

Figure 36:
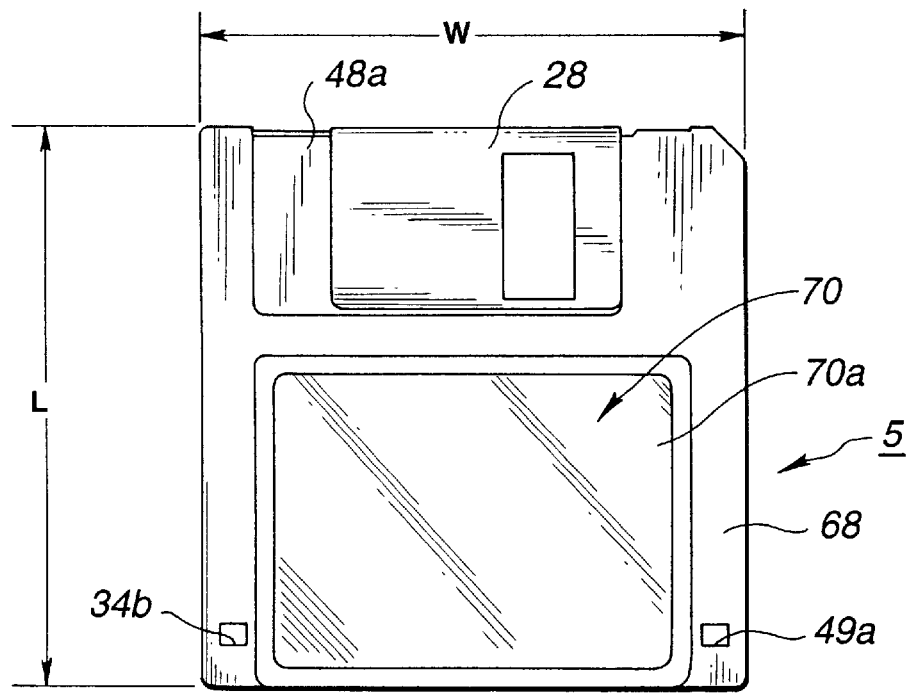
FIG. 36 is a plan view showing a disc cartridge of a fifth embodiment looking from the upper cartridge half of the main cartridge body portion.
Figure 37:
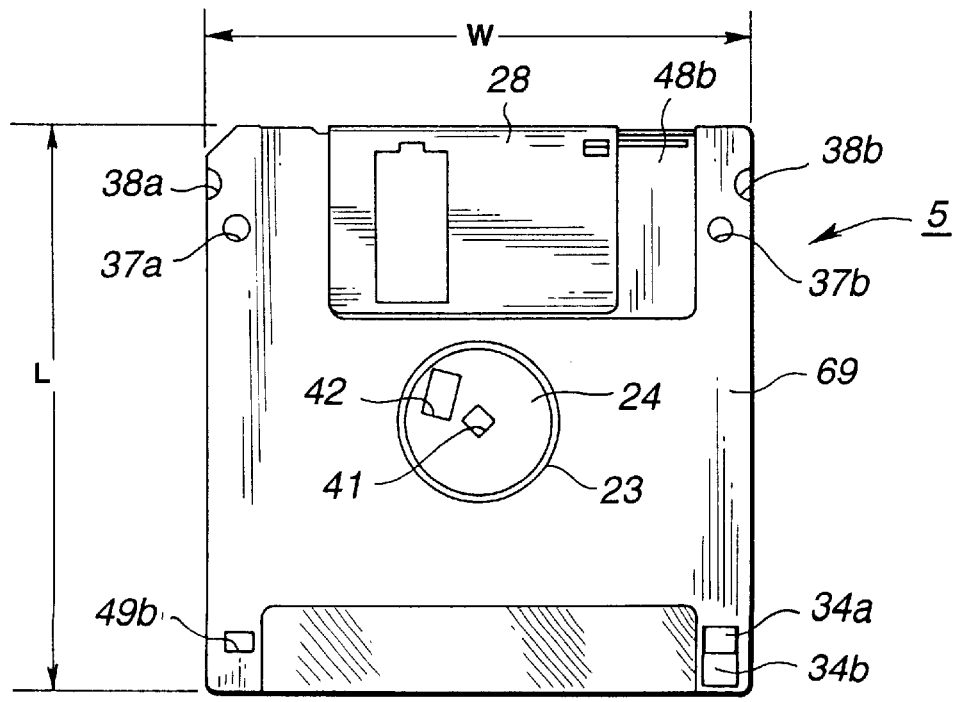
FIG. 37 is a plan view showing the disc cartridge of the fifth embodiment looking from the lower cartridge half of the main cartridge body portion.

Referring to FIGS. 36 and 37, an upper cartridge half 68 constituting a main cartridge body portion 67 of the disc cartridge 5 has, on its major surface, a substantially rectangular insertion regulating portion 70 for regulating mistaken insertion into the conventional recording/reproducing apparatus 110. Referring to FIGS. 36 and 37, this insertion regulating portion 70 is comprised of a substantially rectangular regulating protrusion 70a protuberantly formed in a label area in a major surface of the upper cartridge half 68 which to bond a display label indicating the information recording contents.

Figure 38:
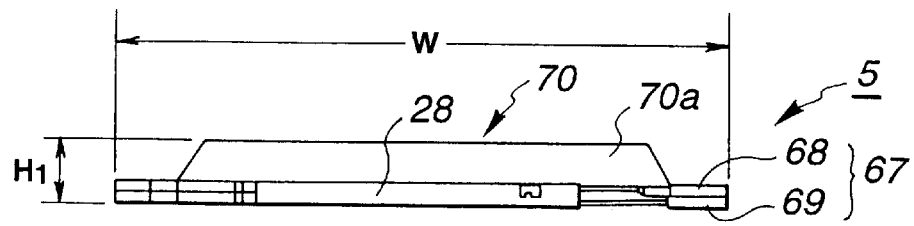
FIG. 38 shows the disc cartridge of FIG. 36 looking from its front side.
Figure 39:
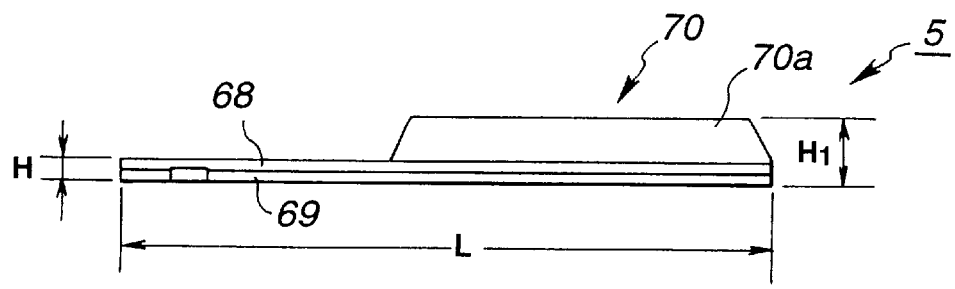
FIG. 39 is a side view showing the disc cartridge of FIG. 36.
Figure 40:
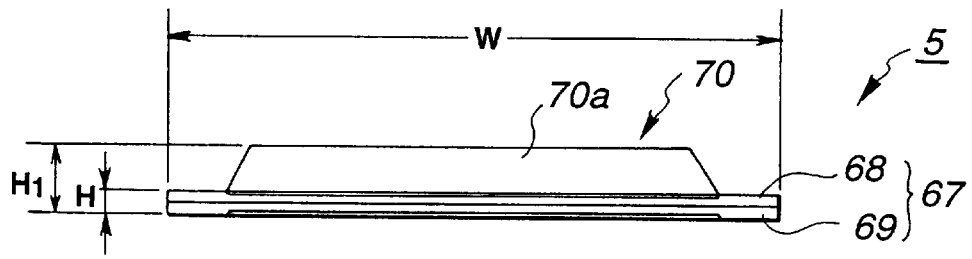
FIG. 40 shows the disc cartridge of FIG. 36 looking from its rear side.

In the upper cartridge half 68 of the main cartridge body portion 67, the height $H_1$ which is the thickness of the insertion regulating portion 70 is set so as to be larger than the height H which is the thickness of the major surface section, as shown in FIGS. 38 to 40. The height $H_1$ of the insertion regulating portion 70 formed on the main cartridge body portion 67 is set to a pre-set value satisfying the relation $$H_1 > (2.5 \times H) \geq H_D \qquad (1)$$

where $H_D$ is the height of the cartridge inserting aperture 110a of the conventional recording/reproducing apparatus 110 and H is the height of the major surface of the main cartridge body portion 103 of the conventional disc cartridge 101. The reason is that the height $H_D$ of the cartridge inserting aperture 110a of the conventional recording/reproducing apparatus 110 is set so as to be 2 to 2.5 times as large as the height H of the major surface section of the main cartridge body portion 103 of the conventional disc cartridge 101.

Figure 41:
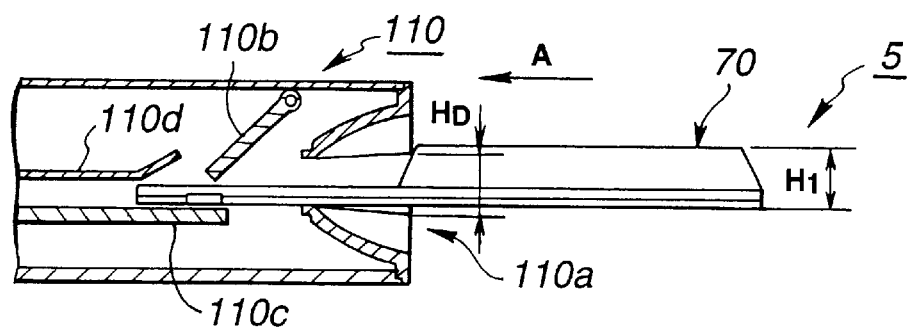
FIG. 41 is a longitudinal cross-sectional view showing the state in which the disc cartridge of FIG. 36 has been inserted into the recording/reproducing apparatus.

With the above-described fifth embodiment of the disc cartridge 5, if it is attempted to insert the disc cartridge 5 via cartridge inserting aperture 110a of the conventional recording/reproducing apparatus 110, as shown in FIG. 41, the insertion regulating portion 70 is abutted against the opening edge of the cartridge inserting aperture 110a when the disc cartridge 5 is inserted up to a mid portion along the length of the main cartridge body portion 67 to disable the insertion because the height $H_1$ of the insertion regulating portion 70 of the main cartridge body portion 67 is set so as to be larger than the height $H_D$ of the cartridge inserting aperture 110a. Thus, the present disc cartridge 2 can be prevented by the insertion regulating portion 70 from being inadvertently inserted into the conventional recording/reproducing apparatus 110.

Referring to FIGS. 42 to 46, a disc cartridge 6 of the sixth embodiment is explained. Since the present disc cartridge 6 is basically the same in structure as the above-described disc cartridge 1 except provision of insertion regulating portions 75, 76, the same components are denoted by the same reference numerals and the corresponding description is omitted for simplicity.

Figure 42:
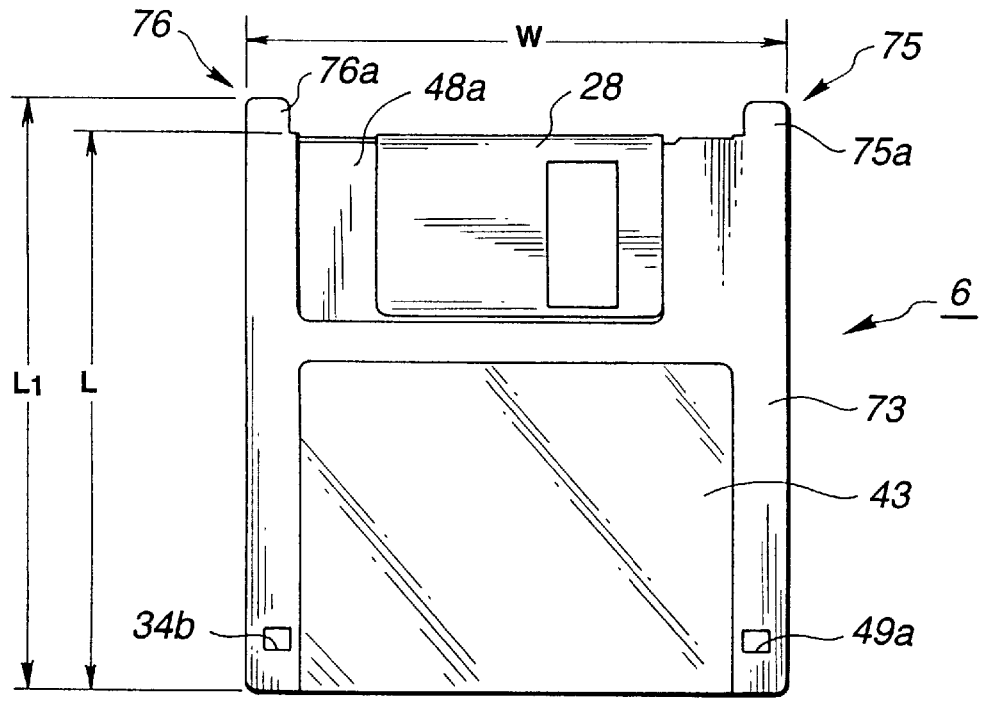
FIG. 42 is a plan view showing a disc cartridge of a sixth embodiment looking from the upper cartridge half of the main cartridge body portion.
Figure 43:
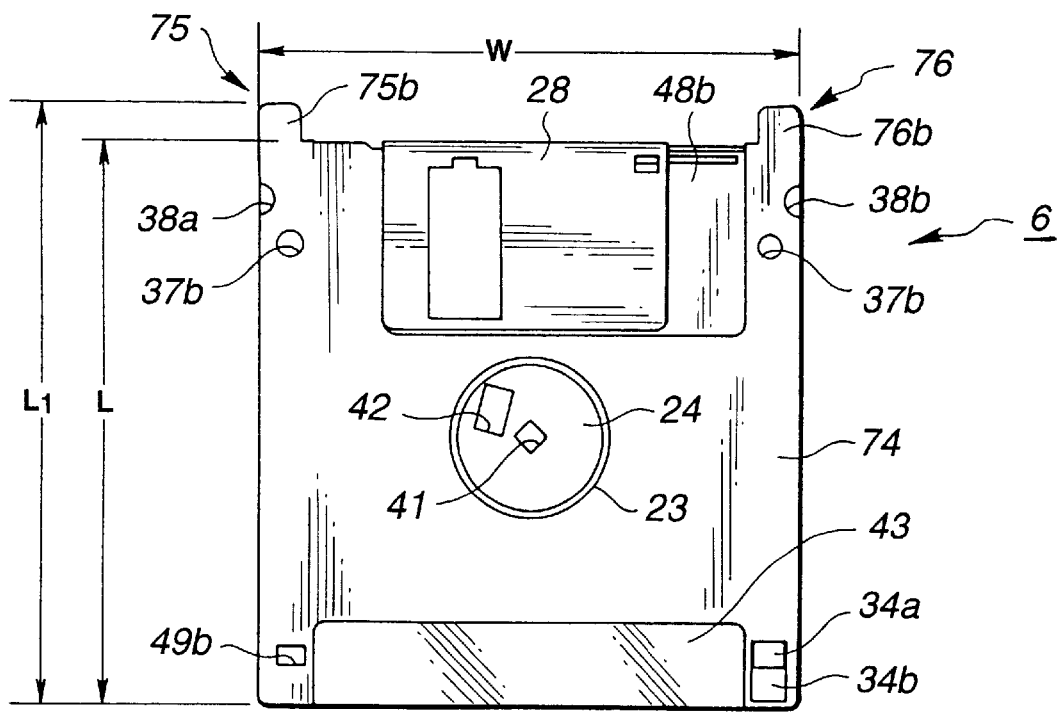
FIG. 43 is a plan view showing the disc cartridge of the sixth embodiment looking from the lower cartridge half of the main cartridge body portion.
Figure 44:
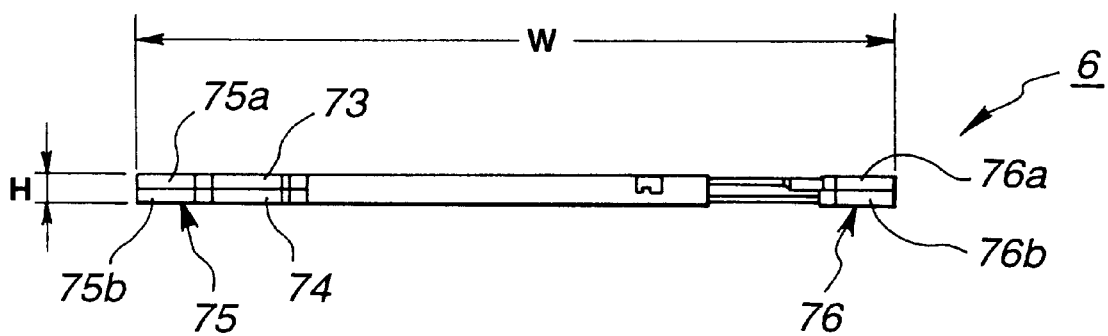
FIG. 44 shows the disc cartridge of FIG. 42 looking from its front side.

Referring to FIGS. 42 and 43, the upper cartridge half 73 and the lower cartridge half 74 of the main cartridge body portion 72 of the present disc cartridge 6 are formed with insertion regulating portions 75, 76 for extending parallel to the direction of insertion into the recording/reproducing apparatus. These insertion regulating portions 75, 76 are formed on the inserting ends of the cartridge halves parallel to the direction of insertion and operate for regulating mistaken insertion of the disc cartridge into the conventional recording/reproducing apparatus.

Referring to FIGS. 42 to 44 and 46, these insertion regulating portions 75, 76 are made up of regulating protrusions 75a, 76a formed at the inserting ends of both lateral edges thereof parallel to the direction insertion of the upper cartridge half 73 for being projected towards the direction of insertion, and regulating protrusions 75b, 76b formed at the inserting ends of both lateral edges thereof parallel to the direction insertion of the lower cartridge half 74 for being projected towards the direction of insertion.

Figure 45:
FIG. 45 is a side view showing the disc cartridge of FIG. 42.
Figure 46:
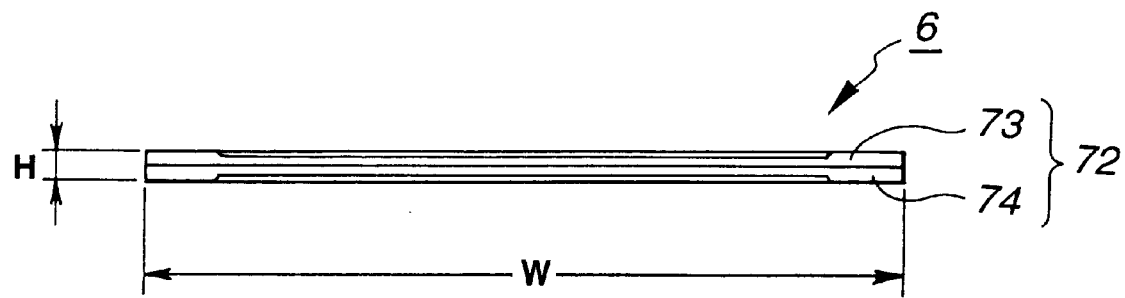
FIG. 46 shows the disc cartridge of FIG. 42 looking from its rear side.
Figure 47:
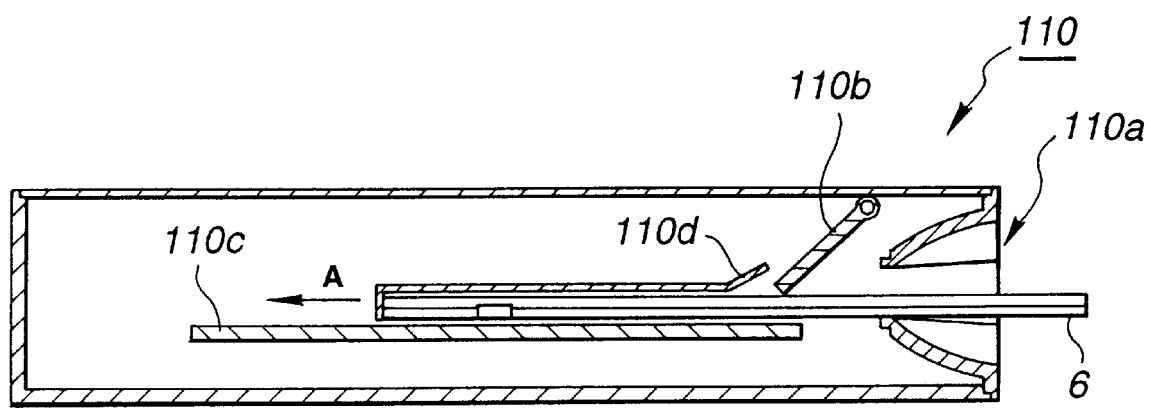
FIG. 47 is a longitudinal cross-sectional view showing the state in which the disc cartridge of FIG. 42 is being inserted into the recording/reproducing apparatus.

That is, the lateral edges of the main cartridge body portion 72 parallel to the direction of insertion are of a longitudinal size $L_1$ of the portions provided with the regulating protrusions 75a, 76a longer than the longitudinal size of the mid portion, as shown in FIGS. 42, 43 and 45. If the longitudinal size of the cartridge loading section of the conventional recording/reproducing apparatus 110 is $L_D$, the longitudinal size $L_1$ of the insertion regulating portions 75, 76 formed in the main cartridge body portion 72 is set to a pre-set value satisfying the relation $$L_1 > L_D \qquad (2)$$

Figure 48:
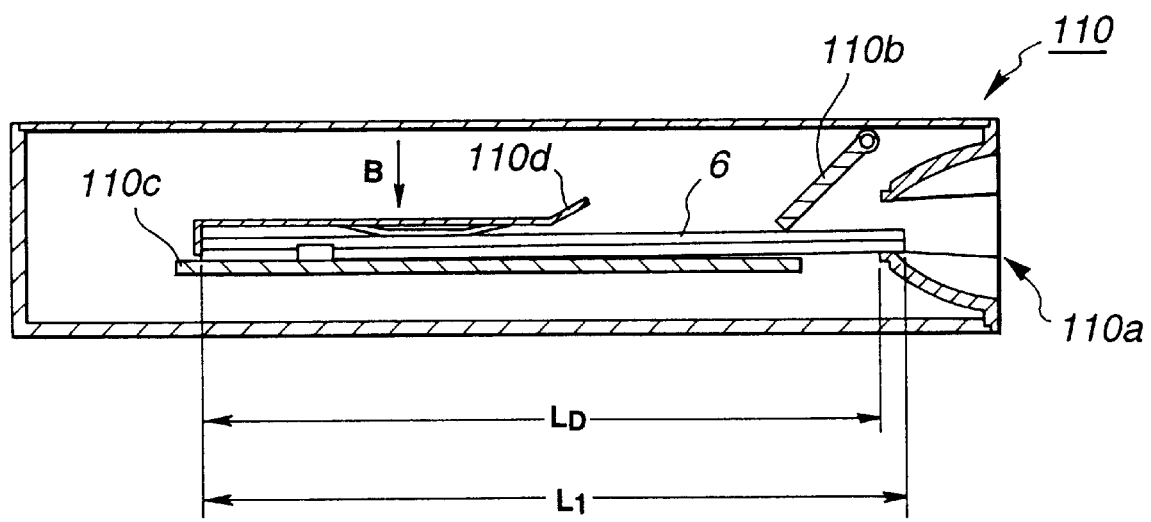
FIG. 48 is a longitudinal cross-sectional view showing the state in which the disc cartridge of FIG. 42 has been inserted into the recording/reproducing apparatus.

When the above-described disc cartridge 6 of the sixth embodiment is loaded in the direction indicated by arrow A from the cartridge insertion aperture 110a of the conventional recording/reproducing apparatus 110, the rear end of the main cartridge body portion 72 compresses against and rides on a guide portion of the cartridge insertion aperture 110a, to disable loading in the direction of arrow B in FIG. 48, because the longitudinal size $L_1$ of the lateral edges of the main cartridge body portion 72 parallel to its direction of insertion is longer than the longitudinal size $L_D$ of the cartridge loading section of the conventional recording/reproducing apparatus 110.

That is, with the conventional recording/reproducing apparatus 110, the holder member 110d cannot hold nor accommodate the disc cartridge 6 therein, so that, with the present disc cartridge 6, the insertion regulating portions 75, 76 positively prevent mistaken loading thereof on the conventional recording/reproducing apparatus 110.

In the above-described main cartridge body portion 72 of the disc cartridge 6, the regulating protrusions are formed on both lateral edges thereof parallel to the direction of insertion into the recording/reproducing apparatus. However, similar effects can also be realized by forming the regulating protrusion only on one lateral edge if the longitudinal size of the one lateral side edge so as to satisfy the above relation (2). On the other hand, although the regulating protrusions 75a, 75b, 76a, 76b are protuberantly formed towards the inserting edges of both lateral edges of the upper cartridge half 73 and the lower cartridge half 74 of the main cartridge body portion 72 for projecting in the inserting direction, similar effects may also be realized by protuberantly forming the regulating protrusions in the direction of insertion on the rear edges opposite to the forward ends corresponding to the inserting ends.

Referring to FIGS. 49 to 53, a disc cartridge 7 of the seventh embodiment is explained. Since the present disc cartridge 7 is basically the same in structure as the above-described disc cartridge 1 except provision of insertion regulating portions 80, 81, the same components are denoted by the same reference numerals and the corresponding description is omitted for simplicity.

Figure 49:
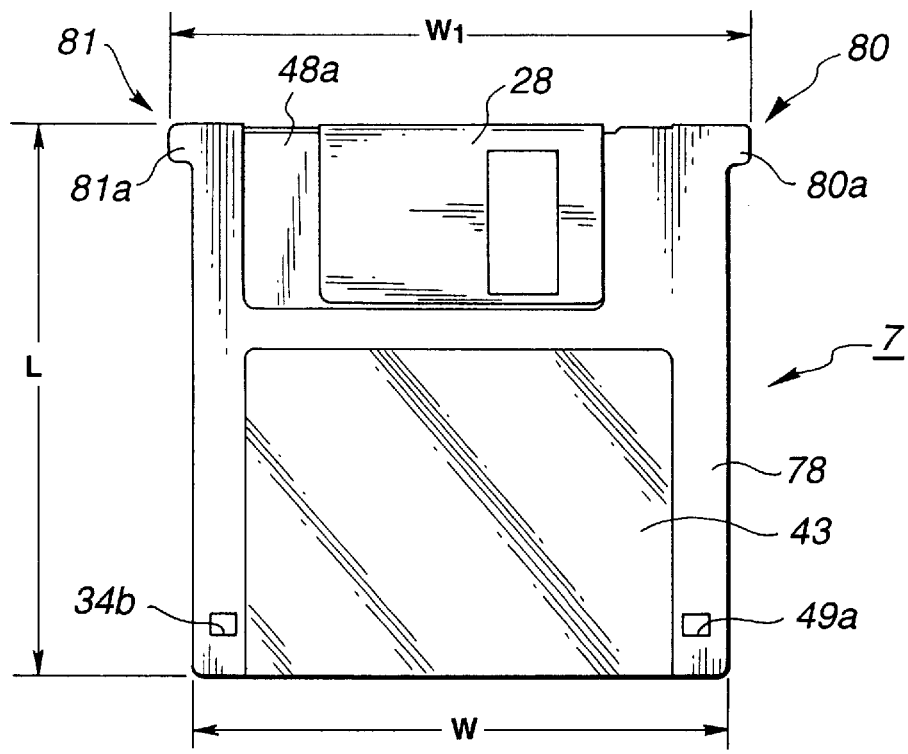
FIG. 49 is a plan view showing a disc cartridge of a seventh embodiment looking from the upper cartridge half of the main cartridge body portion.
Figure 50:
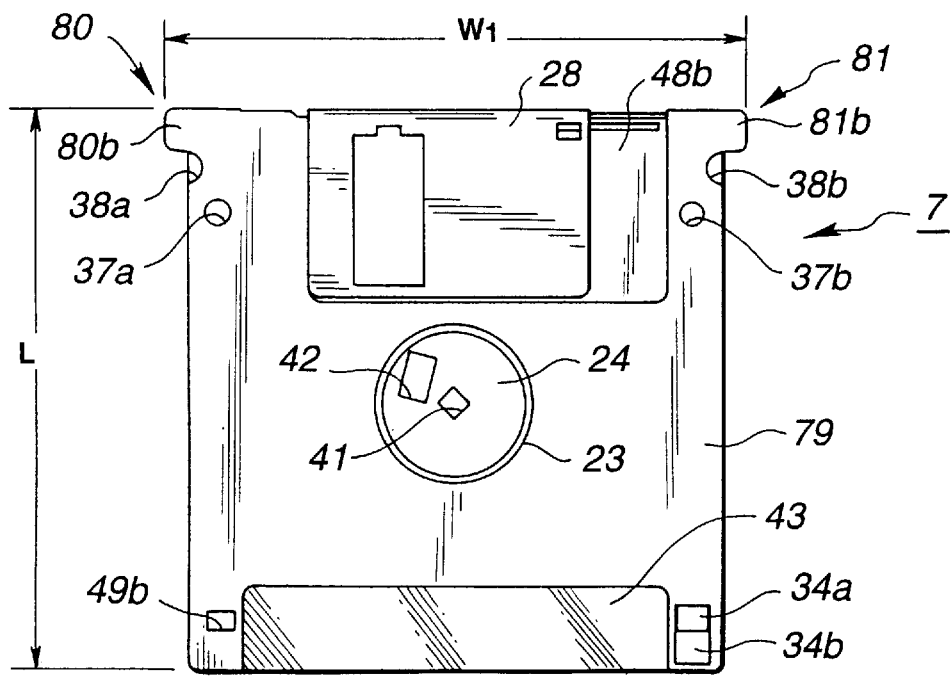
FIG. 50 is a plan view showing the disc cartridge of the seventh embodiment looking from the lower cartridge half of the main cartridge body portion.

Referring to FIGS. 49 and 50, the upper cartridge half 78 and the lower cartridge half 79 of the main cartridge body portion 77 of the present disc cartridge 7 are formed with insertion regulating portions 80, 81 for extending parallel to the direction of insertion into the recording/reproducing apparatus. These insertion regulating portions 80, 81 are formed on the inserting ends of both lateral sides of the cartridge halves parallel to the direction of insertion into the recording/reproducing apparatus and operate for regulating mistaken insertion of the disc cartridge into the conventional recording/reproducing apparatus.

Referring to FIGS. 49 and 50, these insertion regulating portions 80, 81 are made up of regulating protrusions 80a, 81a protuberantly formed in the direction of width on the inserting ends of both lateral edges of the upper cartridge half 78 parallel to its inserting direction and regulating protrusions 80b, 81b protuberantly formed in the direction of width on the inserting ends of both lateral edges of the lower cartridge half 79 parallel to its inserting direction.

Figure 51:
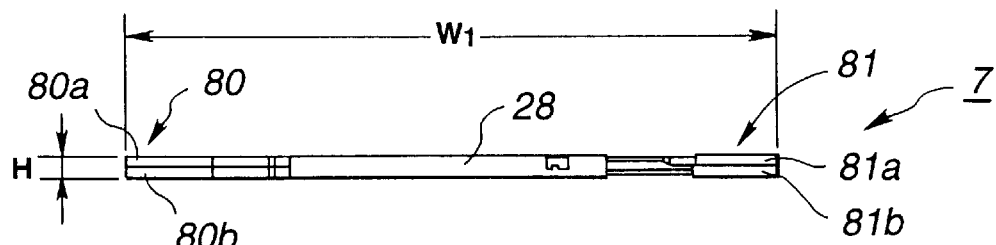
FIG. 51 shows the disc cartridge of FIG. 49 looking from its front side.
Figure 52:
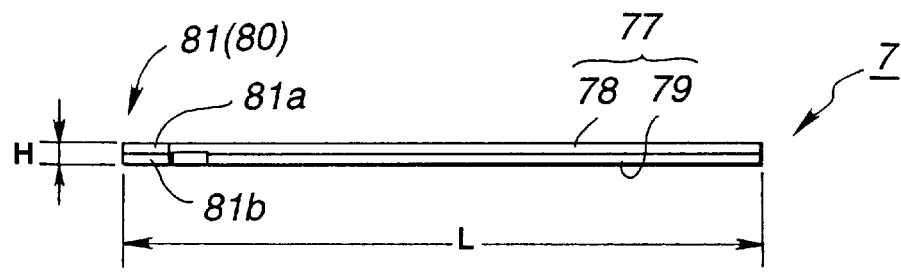
FIG. 52 is a side view showing the disc cartridge of FIG. 49.
Figure 53:
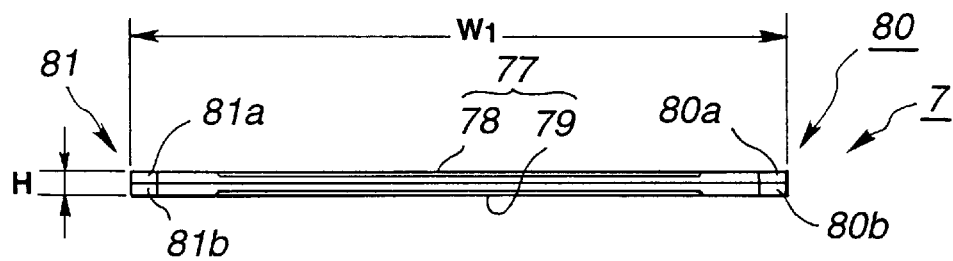
FIG. 53 shows the disc cartridge of FIG. 49 looking from its rear side.

That is, the inserting end of the main cartridge body portion 77 is formed so that the width $W_1$ of the insertion regulating portions 80, 81 will be larger than the width W on its rear end, as shown in FIGS. 51 to 53. The width $W_1$ of the insertion regulating portions 80, 81 formed on the main cartridge body portion 77 is set to a pre-set value so as to satisfy the relation:

$$W_1 > W_D \approx L \qquad (3)$$

because the width $W_D$ of the cartridge insertion aperture 110a of the conventional recording/reproducing apparatus 110 is approximately equal to the longitudinal size L of the main cartridge body portion 103 of the conventional disc cartridge 101.

Figure 54:
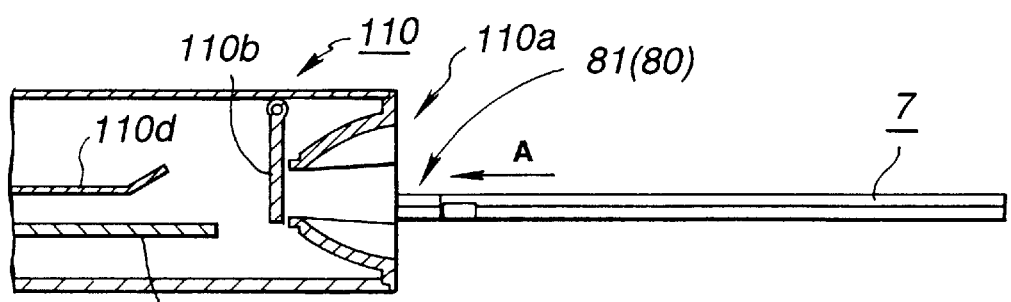
FIG. 54 is a longitudinal cross-sectional view showing the state in which the disc cartridge of FIG. 49 has been inserted into the recording/reproducing apparatus.

When the above-described disc cartridge 7 of the seventh embodiment is loaded in the direction indicated by arrow A from the cartridge insertion aperture 110a of the conventional recording/reproducing apparatus 110, the main cartridge body portion 77 compresses against the cartridge insertion aperture 110a to disable loading because the width $W_1$ of the main cartridge body portion 77 is longer than the width $W_D$ of the cartridge loading section of the conventional recording/reproducing apparatus 110, as shown in FIG. 54. Thus, with the present disc cartridge 7, the insertion regulating portions 80, 81 positively prevent mistaken loading of the disc cartridge on the conventional recording/reproducing apparatus 110.

In the above-described main cartridge body portion 77 of the disc cartridge 7, the regulating protrusions 80a, 81a, 80b, 81b are formed on both lateral edges thereof parallel to the direction of insertion into the recording/reproducing apparatus. However, similar effects can also be realized by forming the regulating protrusion only on one lateral edge if the width L1 of the insertion regulating portion having the regulating protrusion formed on the one lateral side edge satisfies the above relation (2). On the other hand, although the regulating protrusions 80a, 80b, 81a, 81b are protuberantly formed towards the inserting edges of both lateral edges of the upper cartridge half 78 and the lower cartridge half 79 of the main cartridge body portion 77 for projecting in the inserting direction, similar effects may also be realized by protuberantly forming the regulating protrusions in the direction of width on the rear edges opposite to the forward ends corresponding to the inserting ends.

Referring to FIGS. 55 to 59, a disc cartridge 8 of the eighth embodiment is explained. Since the present disc cartridge 8 is basically the same in structure as the above-described disc cartridge 1 except provision of insertion regulating portions 85, 86, the same components are denoted by the same reference numerals and the corresponding description is omitted for simplicity.

Figure 55:
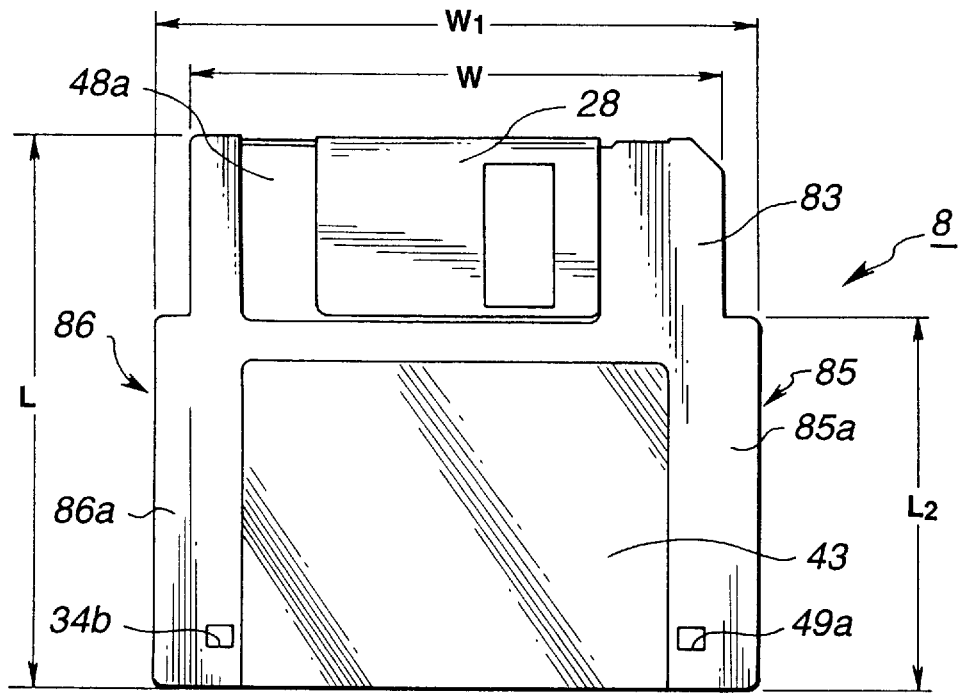
FIG. 55 is a plan view showing a disc cartridge of an eighth embodiment looking from the upper cartridge half of the main cartridge body portion.
Figure 56:
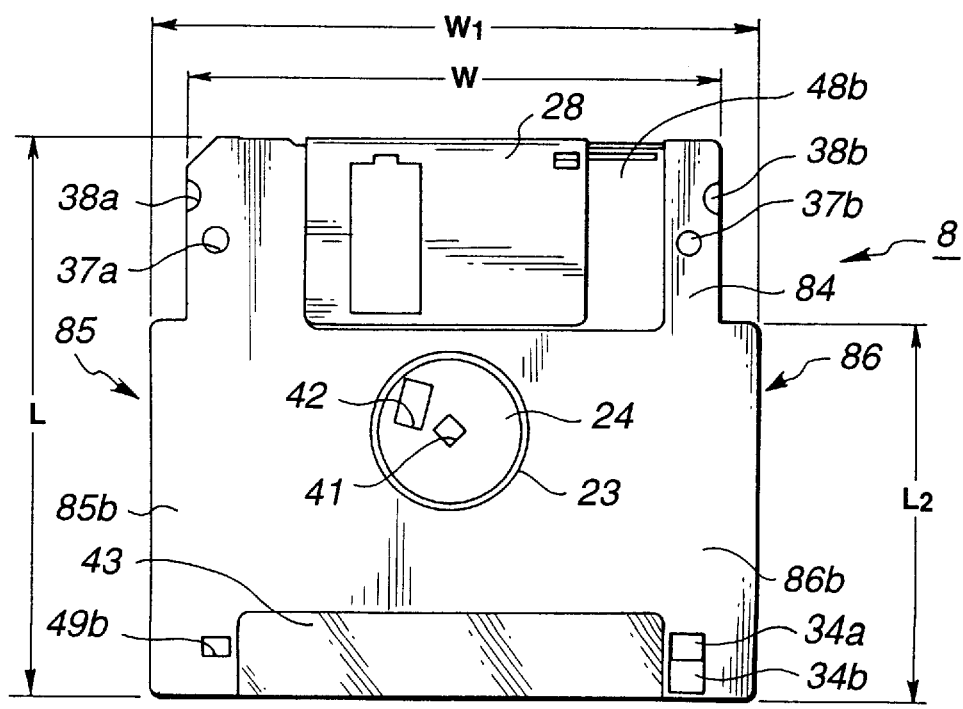
FIG. 56 is a plan view showing the disc cartridge of the eighth embodiment looking from the lower cartridge half of the main cartridge body portion.

Referring to FIGS. 55 and 56, the upper cartridge half 83 and the lower cartridge half 84 of the main cartridge body portion 82 of the present disc cartridge 8 are formed with insertion regulating portions 85, 86 for extending parallel to the direction of insertion into the recording/reproducing apparatus. These insertion regulating portions 85, 86 are formed on the inserting ends of both lateral sides of the cartridge halves parallel to the direction of insertion into the recording/reproducing apparatus and operate for regulating mistaken insertion of the disc cartridge into the conventional recording/reproducing apparatus 110.

Referring to FIGS. 55 and 56, these insertion regulating portions 85, 86 are made up of regulating protrusions 85a, 86a protuberantly formed in the direction of width on both lateral edges of the upper cartridge half 83 parallel to its inserting direction and regulating protrusions 85b, 86b protuberantly formed in the direction of width on both lateral edges of the lower cartridge half 84 parallel to its inserting direction.

Figure 57:
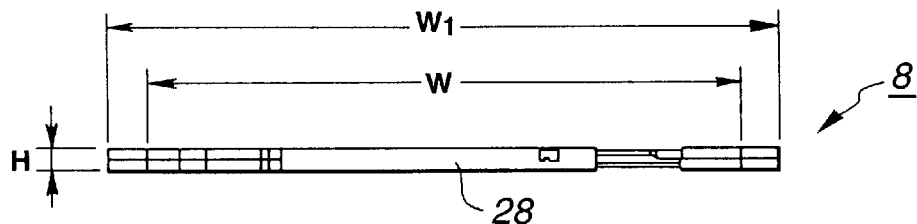
FIG. 57 shows the disc cartridge of FIG. 55 looking from its front side.
Figure 58:
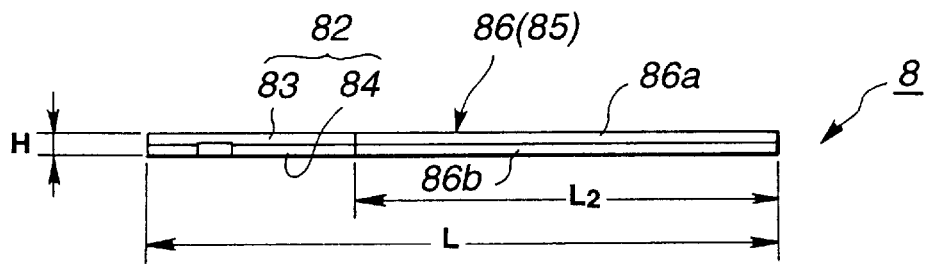
FIG. 58 is a side view showing the disc cartridge of FIG. 55.
Figure 59:
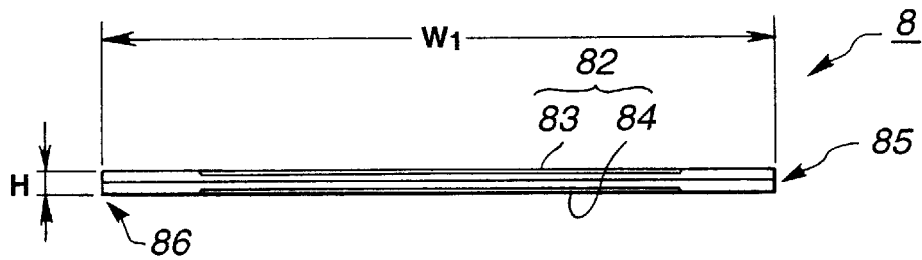
FIG. 59 shows the disc cartridge of FIG. 55 looking from its rear side.

That is, the inserting end of the main cartridge body portion 82 is formed so that the width $W_1$ of the insertion regulating portions 85, 86 will be larger than the width $W_1$ on its rear end, as shown in FIGS. 57 to 59. The width $W_1$ of the insertion regulating portions 85, 86 formed on the main cartridge body portion 82 is set to a pre-set value so as to satisfy the relation:

$$W_1 > W_D \approx L \qquad (3)$$

because the width $W_D$ of the cartridge insertion aperture 110a of the conventional recording/reproducing apparatus 110 is approximately equal to the longitudinal size L of the main cartridge body portion 82.

The insertion regulating portions 85, 86 are formed to a longitudinal size L2 which is not less than one-half the longitudinal size L of the main cartridge body portion 82. Meanwhile, the longitudinal size L2, corresponding to the length of the insertion regulating portions 85, 86, is optionally set in connection with, for example, the start position of movement of the holder member 110d, for example, of the recording/reproducing apparatus 110 relative to the turntable.

Figure 60:
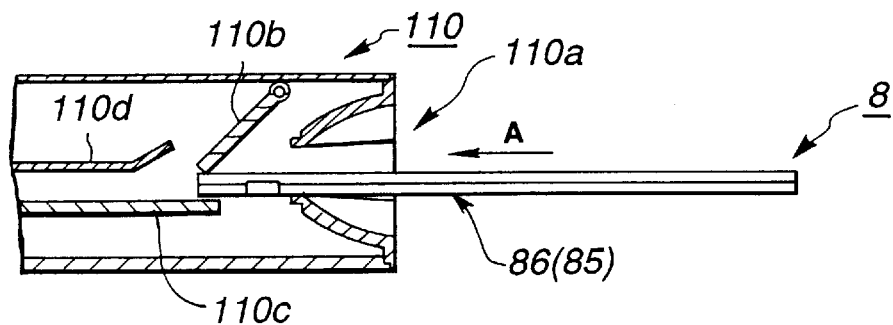
FIG. 60 is a longitudinal cross-sectional view showing the state in which the disc cartridge of FIG. 55 has been inserted into the recording/reproducing apparatus.

When the above-described disc cartridge 8 of the eighth embodiment is loaded in the direction indicated by arrow A via the cartridge insertion aperture 110a of the conventional recording/reproducing apparatus 110, the insertion regulating portions 85, 86 compress against the cartridge insertion aperture 110a to disable loading because the width $W_1$ of the main cartridge body portion 82 is longer than the width $W_1$ of the cartridge loading aperture 110a of the conventional recording/reproducing apparatus 110, as shown in FIG. 60. Thus, with the present disc cartridge 8, the insertion regulating portions 85, 86 positively prevent mistaken loading of the disc cartridge on the conventional recording/reproducing apparatus 110.

Although one of the insertion regulating portion types is applied by itself to each of the disc cartridges 1 to 8, plural types of the insertion regulating portions may also be used in combination.

Although the magnetic disc 11 is used as a disc-shaped recording medium for the disc cartridges 1 to 8, dis-shaped recording mediums other than the magnetic disc 11, such as a magneto-optical disc, may also be used within he scope of the invention.

What is claimed is:

1. A disc cartridge insertable into a recording/reproducing apparatus of a first type comprising:
    a main cartridge body portion formed of an upper cartridge half and a lower cartridge half and having housed therein a disc-shaped recording medium having a first capacity;
    a recording/reproducing aperture provided in said first main cartridge body portion for being faced by recording and/or reproducing means provided in the recording/reproducing apparatus of the first type;
    a shutter member provided for opening/closing said recording/reproducing aperture; and
    a loading regulating portion provided on said main cartridge portion for preventing loading of said main cartridge body portion having a first capacity into a recording and/or reproducing apparatus adapted for loading only a disc cartridge having housed therein a disc-shaped recording medium having a second capacity different from said first capacity, said loading regulating portion only including regulating protrusions formed laterally and protuberantly along corners of forward end portions of said upper cartridge half and said lower cartridge half of said main cartridge body portion in an insertion direction which combined are of a height $H_1$ which satisfies the relation $H_1 > (2.5 \times H) \geq H_D$ where $H_D$ is the height of the disc insertion opening of the recording and/or reproducing apparatus of said second type and H is the height of the main cartridge body portion.

2. The disc cartridge as claimed in claim 1 wherein said loading regulating portion is formed by increasing the thickness of said main cartridge body portion.

3. The disc cartridge as claimed in claim 2 wherein said loading regulating portion is formed by protruding a forward end corner faced by the recording and/or reproducing apparatus in the direction of thickness of said main cartridge body portion.

4. The disc cartridge as claimed in claim 2 wherein said loading regulating portion is formed by protruding at least one lateral edge parallel to the direction of insertion into the recording and/or reproducing apparatus in the direction of thickness of said main cartridge body portion.

5. The disc cartridge as claimed in claim 2 wherein said main cartridge body portion has a label area in which to indicate the contents of the recorded information; and wherein
    said loading regulating portion is formed by protruding said label area in the direction of thickness of said main cartridge body portion.

6. The disc cartridge as claimed in claim 2 wherein said main cartridge body portion is formed with a recess for shutter movement in which said shutter member is movable; and wherein
    said loading regulating portion is formed by protruding the outer rim of said recess for shutter movement in the direction of thickness of said main cartridge body portion.

* * * * *